United States Patent
Tone et al.

(10) Patent No.: US 11,130,890 B2
(45) Date of Patent: Sep. 28, 2021

(54) ADHESIVE COMPOSITION, ADHESIVE SHEET, AND METHOD FOR PRODUCING SAME

(71) Applicants: TOYO INK SC HOLDINGS CO., LTD., Tokyo (JP); TOYOCHEM CO., LTD., Tokyo (JP)

(72) Inventors: Yoshitaka Tone, Tokyo (JP); Toru Oya, Tokyo (JP); Tetsuya Natsumoto, Tokyo (JP); Hiroyuki Hayashi, Tokyo (JP); Naoki Takeuchi, Tokyo (JP); Yutaro Kato, Tokyo (JP)

(73) Assignees: TOYO INK SC HOLDINGS CO., LTD., Tokyo (JP); TOYOCHEM CO., LTD., Tokyo (JP)

( * ) Notice: Subject to any disclaimer, the term of this patent is extended or adjusted under 35 U.S.C. 154(b) by 75 days.

(21) Appl. No.: 15/545,320

(22) PCT Filed: Jan. 21, 2016

(86) PCT No.: PCT/JP2016/051712
§ 371 (c)(1),
(2) Date: Jul. 21, 2017

(87) PCT Pub. No.: WO2016/117646
PCT Pub. Date: Jul. 28, 2016

(65) Prior Publication Data
US 2018/0044562 A1    Feb. 15, 2018

(30) Foreign Application Priority Data

Jan. 21, 2015 (JP) .............................. JP2015-009435
Feb. 19, 2015 (JP) .............................. JP2015-030824

(51) Int. Cl.
*C09J 133/14* (2006.01)
*C09J 7/30* (2018.01)
(Continued)

(52) U.S. Cl.
CPC ........ *C09J 133/14* (2013.01); *C08G 18/2815* (2013.01); *C08G 18/3212* (2013.01);
(Continued)

(58) Field of Classification Search
CPC .. C08K 5/01; C08K 5/05; C09J 133/14; C09J 2433/00; C09J 7/385; C09J 11/06; C09J 7/30
See application file for complete search history.

(56) References Cited

U.S. PATENT DOCUMENTS 5,298,258 A * 3/1994 Akemi ................. A61K 9/7061
424/484
5,646,221 A * 7/1997 Inagi .................... A61K 9/7061
526/238.2
(Continued)

FOREIGN PATENT DOCUMENTS

CN    1674914    9/2005
CN    101163770  4/2008
(Continued)

OTHER PUBLICATIONS

"Office Action of China Counterpart Application," with English translation thereof, dated Oct. 8, 2018, p. 1-p. 14.
(Continued)

*Primary Examiner* — Scott R. Walshon
(74) *Attorney, Agent, or Firm* — JCIPRNET

(57) ABSTRACT

An adhesive composition that exhibits excellent adhesive performance such as curved surface adhesiveness to low-polarity adherends and constant load peeling properties in high-temperature environments, and also an adhesive sheet and a method for producing the same.

11 Claims, 1 Drawing Sheet

(51) Int. Cl.
*C08K 5/01* (2006.01)
*C08K 5/05* (2006.01)
*C09J 133/02* (2006.01)
*C09J 4/06* (2006.01)
*C08G 18/67* (2006.01)
*C08G 18/80* (2006.01)
*C09J 175/14* (2006.01)
*C08G 18/76* (2006.01)
*C08G 18/62* (2006.01)
*C09J 175/16* (2006.01)
*C08G 18/32* (2006.01)
*C08G 18/28* (2006.01)
*C09J 11/06* (2006.01)

(52) U.S. Cl.
CPC ....... *C08G 18/6245* (2013.01); *C08G 18/676* (2013.01); *C08G 18/6735* (2013.01); *C08G 18/7621* (2013.01); *C08G 18/7642* (2013.01); *C08G 18/8025* (2013.01); *C09J 4/06* (2013.01); *C09J 7/30* (2018.01); *C09J 11/06* (2013.01); *C09J 133/02* (2013.01); *C09J 175/14* (2013.01); *C09J 175/16* (2013.01); *C08K 5/01* (2013.01); *C08K 5/05* (2013.01); *C09J 2301/408* (2020.08); *C09J 2433/00* (2013.01)

(56) References Cited

U.S. PATENT DOCUMENTS

| | | | | |
|---|---|---|---|---|
| 7,867,986 | B2* | 1/2011 | Houze | A61K 9/0014 514/171 |
| 8,361,493 | B2* | 1/2013 | Ishikura | A61L 15/585 424/448 |
| 2003/0113365 | A1* | 6/2003 | Schaberg | A61K 9/7053 424/449 |
| 2006/0036040 | A1* | 2/2006 | Takeko | C09J 133/04 525/192 |
| 2006/0127464 | A1 | 6/2006 | Sugawara et al. | |
| 2007/0135543 | A1* | 6/2007 | Yasuda | C09J 11/06 524/271 |
| 2008/0118751 | A1* | 5/2008 | Zollner | C09J 133/04 428/343 |
| 2008/0171830 | A1* | 7/2008 | Centner | C08F 220/36 524/588 |
| 2008/0200593 | A1 | 8/2008 | Yue et al. | |
| 2017/0112958 | A1* | 4/2017 | Watanabe | A61L 24/001 |

FOREIGN PATENT DOCUMENTS

| | | |
|---|---|---|
| JP | H07-228851 | 8/1995 |
| JP | 200-265138 | 9/2000 |
| JP | 2004-075537 | 3/2004 |
| JP | 2005-330442 | 12/2005 |
| JP | 2006-328104 | 12/2006 |
| JP | 2007-091918 | 4/2007 |
| JP | 2007-145920 | 6/2007 |
| JP | 2008-537004 | 9/2008 |
| JP | 2011-116757 | 6/2011 |
| JP | 2012184410 A * | 9/2012 |
| JP | 2012-200868 | 10/2012 |
| JP | 2012-219083 | 11/2012 |

OTHER PUBLICATIONS

"International Search Report (Form PCT/ISA/210) of PCT/JP2016/051712," dated Apr. 19, 2016, with English translation thereof, pp. 1-4.

"Office Action of China Counterpart Application", dated Apr. 1, 2019, with English translation thereof, p. 1-p. 9.

"Office Action of China Counterpart Application", dated Aug. 28, 2019, with English translation thereof, p. 1-p. 10.

* cited by examiner

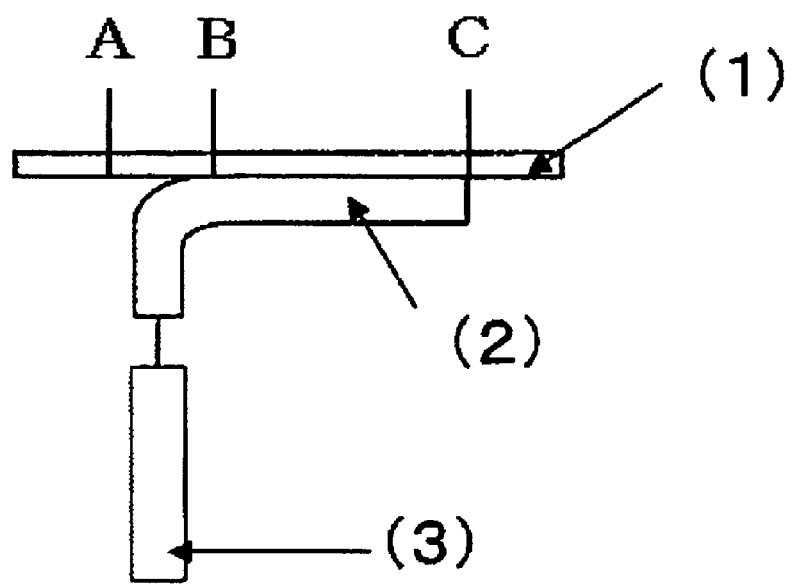

ADHESIVE COMPOSITION, ADHESIVE SHEET, AND METHOD FOR PRODUCING SAME

CROSS-REFERENCE TO RELATED APPLICATION

This application is a 371 application of the international PCT application serial no. PCT/JP2016/051712, filed on Jan. 21, 2016, which claims the priority benefit of Japan application no. 2015-009435, filed on Jan. 21, 2015, and the priority benefit of Japan application no. 2015-030824, filed on Feb. 19, 2015. The entirety of each of the abovementioned patent applications is hereby incorporated by reference herein and made a part of this specification.

TECHNICAL FIELD

The present invention relates to an adhesive composition, an adhesive sheet, and a method for producing the same. More specifically, the invention relates to an adhesive composition that exhibits excellent adhesive properties such as curved surface adhesiveness to low-polarity adherends and constant load peeling properties particularly in high-temperature environments, as well as an adhesive sheet and a method for producing the adhesive sheet.

BACKGROUND ART

Adhesives enable materials to be joined together simply and quickly, and are therefore widely used in all manner of industrial fields. Depending on the application, higher levels of performance tend to be required, including superior adhesiveness regardless of the adherend, resistance to peeling, better adhesion to substrates having curved surfaces, or good adhesiveness under harsh environmental conditions.

Among the various materials, polyolefin materials typified by polyethylene (PE) and polypropylene (PP) have tended to be used in increasing amounts in recent years, particularly in the automotive field, but because these materials have low polarity, adhesives tend to bond poorly to them. In particular, the curved-surface adhesiveness to low-polarity adherends tends to be particularly susceptible to stress caused by deformation, increasing the likelihood of problems such as edge peeling or lifting within recessed portions.

Moreover, in the harsh environment of significant temperature fluctuation found inside an automobile, and particularly in a high-temperature environment, superior levels of adhesive strength and constant load peeling properties are required to prevent lifting or peeling of bonded portions, but most typical adhesives tend to exhibit insufficient cohesive force when used in high-temperature environments, and consequently suffer from unsatisfactory heat resistance, resulting in lifting or peeling.

One known technique for enhancing the curved-surface adhesiveness to adherends, the constant load peeling properties and the heat resistance of an adhesive is a method in which an adhesion-imparting agent (tackifier) such as a rosin-based resin, terpene-based resin, aliphatic compound (C5-based), aromatic compound (C9-based), alicyclic compound (hydrogenated product), styrene-based resin, phenol-based resin or xylene-based resin is added to an acrylic-based adhesive composition, but the performance of such adhesives is not entirely satisfactory, and the curved-surface adhesiveness and constant load peeling properties under high-temperature conditions are not entirely satisfactory (Patent Documents 1 to 3).

Further, interior materials used for enhancing the design characteristics, comfort and safety inside vehicles, including the materials used for instrument panels, door materials, seats, ceiling materials, rear trays and pillars, are typically formed from surface skin materials, but because such surface skin materials have a three-dimensional curved surface, their adhesive properties tend to be significantly inferior to sheet-like films having a flat surface.

One technique that has been disclosed for improving the anchoring effect to surface skin materials is a method in which the surface skin material and the adherend are pressed together with a fixed pressure with the adhesive interposed therebetween, but no mention is made of the constant load peeling properties, and with conventional adhesives, even if compression is performed to improve the anchoring effect of the surface skin material, the constant load peeling properties under high-temperature conditions are still unsatisfactory (Patent Document 4).

CITATION LIST

Patent Documents

Patent Document 1: JP H07-228851 A
Patent Document 2: JP 2000-265138 A
Patent Document 3: JP 2007-091918 A
Patent Document 4: JP 2012-200868 A

SUMMARY OF THE INVENTION

Problems to be Solved by the Invention

The present invention provides an adhesive composition that exhibits excellent adhesive properties such as curved surface adhesiveness to low-polarity adherends and constant load peeling properties in high-temperature environments, as well as providing an adhesive sheet and a method for producing the adhesive sheet.

Means to Solve the Problems

As a result of intensive investigation, the inventors of the present invention were able to complete the present invention.

One embodiment of the present invention provides an adhesive composition comprising an acrylic polymer (A), a polyfunctional isocyanate compound (B) and a compound (C) having a steroid skeleton, wherein the acrylic polymer (A) is an acrylic polymer having a hydroxyl group and/or a carboxyl group, and the amount of the compound (C) having a steroid skeleton is from 0.1 to 20 parts by mass per 100 parts by mass of the acrylic polymer (A).

Further, one embodiment of the present invention provides the adhesive composition described above, wherein the compound (C) having a steroid skeleton may be a compound (C1) having a steroid skeleton with a hydroxyl group.

Moreover, one embodiment of the present invention provides the adhesive composition described above, wherein the compound (C) having a steroid skeleton may be a compound (C1-2) having a steroid skeleton with a single hydroxyl group.

Further, one embodiment of the present invention provides the adhesive composition described above, wherein the compound (C) having a steroid skeleton may be a compound (C1-3) having a steroid skeleton with a single secondary hydroxyl group.

Furthermore, one embodiment of the present invention provides the adhesive composition described above, wherein the composition may further comprise 0.1 to 10 parts by mass of a silane coupling agent (E) per 100 parts by mass of the acrylic polymer (A).

Another embodiment of the present invention provides an adhesive sheet formed by laminating an adhesive layer formed from the adhesive composition described above to at least one surface of a sheet-like substrate.

In other words, one embodiment of the present invention provides an adhesive sheet prepared by laminating an adhesive layer formed from an adhesive composition to at least one surface of a sheet-like substrate, wherein the adhesive layer is formed from an adhesive composition comprising an acrylic polymer (A), a polyfunctional isocyanate compound (B) and a compound (C) having a steroid skeleton, the acrylic polymer (A) is an acrylic polymer having a hydroxyl group and/or a carboxyl group, and the amount of the compound (C) having a steroid skeleton is from 0.1 to 20 parts by mass per 100 parts by mass of the acrylic polymer (A).

Further, one embodiment of the present invention provides the adhesive sheet described above, wherein the compound (C) having a steroid skeleton may be a compound (C1) having a steroid skeleton with a hydroxyl group.

Moreover, one embodiment of the present invention provides the adhesive sheet described above, wherein the compound (C) having a steroid skeleton may be a compound (C1-2) having a steroid skeleton with a single hydroxyl group.

Further, one embodiment of the present invention provides the adhesive sheet described above, wherein the compound (C) having a steroid skeleton may be a compound (C1-3) having a steroid skeleton with a single secondary hydroxyl group.

Furthermore, one embodiment of the present invention provides the adhesive sheet described above, wherein the sheet may further comprise 0.1 to 10 parts by mass of a silane coupling agent (E) per 100 parts by mass of the acrylic polymer (A).

Further, one embodiment of the present invention provides the adhesive sheet described above, wherein one sheet-like substrate may be a surface skin material (D).

Yet another embodiment of the present invention provides a method for producing an adhesive sheet by forming an adhesive layer by coating and/or bonding on one surface of a surface skin material (D), wherein the adhesive layer includes an adhesive composition comprising an acrylic polymer (A), a polyfunctional isocyanate compound (B) and a compound (C) having a steroid skeleton, the acrylic polymer (A) is an acrylic polymer having a hydroxyl group and/or a carboxyl group, and the amount of the compound (C) having a steroid skeleton is from 0.1 to 20 parts by mass per 100 parts by mass of the acrylic polymer (A).

Effects of the Invention

The present invention is able to provide an adhesive composition that exhibits excellent adhesive properties such as curved surface adhesiveness to low-polarity adherends and constant load peeling properties in high-temperature environments, and also provide an adhesive sheet and a method for producing the adhesive sheet.

BRIEF DESCRIPTION OF THE DRAWINGS

FIG. 1 is a schematic diagram illustrating the testing of the constant load peeling properties of an adhesive sheet.

EMBODIMENTS FOR CARRYING OUT THE INVENTION

Embodiments of the present invention are described below in detail, but the following descriptions are merely examples (representative examples) of aspects of the present invention, and the scope of the present invention is not limited by the content of the following descriptions without departing from the spirit and scope of the present invention.

The adhesive properties mentioned in the present description mean various properties such as the adhesive force, the removability, the holding power, the curved surface adhesiveness and the constant load peeling properties.

<Adhesive Composition>

The adhesive composition of the present invention is an adhesive composition comprising an acrylic polymer (A), a polyfunctional isocyanate compound (B), and a compound (C) having a steroid skeleton.

One embodiment of the adhesive composition of the present invention is a composition comprising the acrylic polymer (A), the polyfunctional isocyanate compound (B), and the compound (C) having a steroid skeleton, wherein
the acrylic polymer (A) is an acrylic polymer having a hydroxyl group and/or a carboxyl group, and
the amount of the compound (C) having a steroid skeleton is from 0.1 to 20 parts by mass per 100 parts by mass of the acrylic polymer (A).

In the adhesive composition of the present invention, the compound (C) having a steroid skeleton may be a compound (C1) having a steroid skeleton with a hydroxyl group.

Further, in the adhesive composition of the present invention, the compound (C) having a steroid skeleton may be a compound (C1-2) having a steroid skeleton with a single hydroxyl group.

Moreover, in the adhesive composition of the present invention, the compound (C) having a steroid skeleton may be a compound (C1-3) having a steroid skeleton with a single secondary hydroxyl group.

Furthermore, the adhesive composition of the present invention may also comprise 0.1 to 10 parts by mass of a silane coupling agent (E) per 100 parts by mass of the acrylic polymer (A).

When the adhesive composition of the present invention is used to form an adhesive sheet, the resulting sheet exhibits good adhesive force to various adherends, and can therefore be used for applications such as sticky labels, double-sided tapes, casting tapes, masking tapes and foam tapes.

Curved surface adhesiveness is tending to be viewed with increased importance in all manner of applications, whereas constant load peeling properties tend to be considered particularly important in automotive applications. The adhesives used in automotive applications are used by processing into double-sided tapes or casting tapes or the like, which are then stuck to interior materials for bonding to automobiles, or used by processing into foam tapes containing an interior material as a substrate, which are then stuck to automobiles. The expression "interior materials" means not only interior materials used inside the vehicle cabin, but also includes sound absorbing materials, cushioning materials, and carpets and the like used in the engine bay or the like, and can be used to mean all manner of materials used in automotive vehicles.

<Compound (C) having a Steroid Skeleton>

The compound (C) having a steroid skeleton is a compound having a basic structure composed of a cyclopentanoperhydrophenanthrene nucleus (similar to a steroid nucleus), and although hormones and the like are common examples, the compound (C) may have a multitude of structures depending on substituents, and compounds that exist in plants are also numerous.

Examples of the compound (C) having a steroid skeleton include compounds having a cyclopentanoperhydrophenanthrene nucleus, compounds having a double bond in an aliphatic ring of such a nucleus, and compounds of either of these types having additional substituents. Specific examples of these substituent-containing compounds include, but not limited to, compounds represented by formulas [1] to [12] shown below, and saponins and the like.

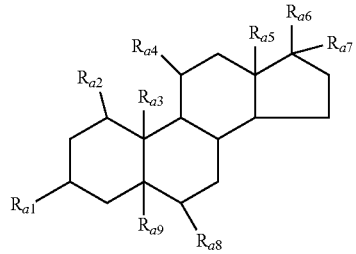

[1]

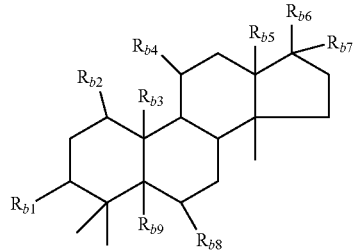

[2]

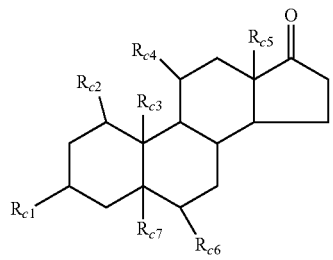

[3]

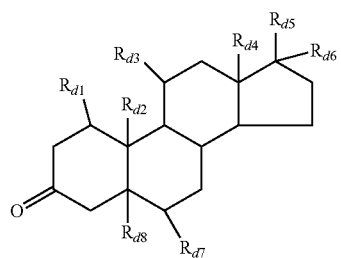

[4]

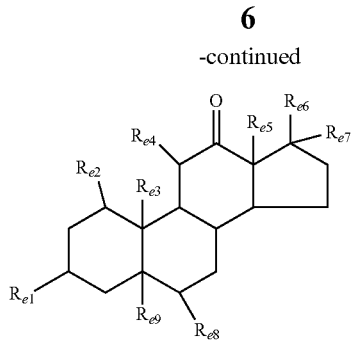

[5]

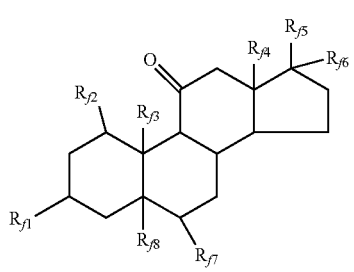

[6]

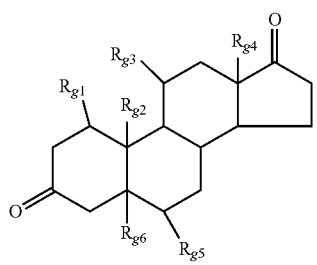

[7]

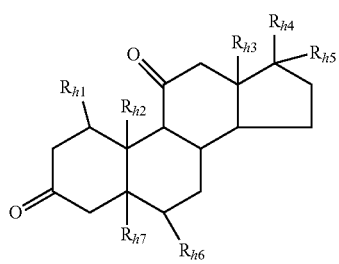

[8]

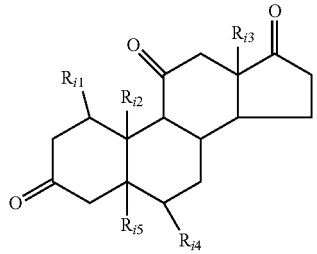

[9]

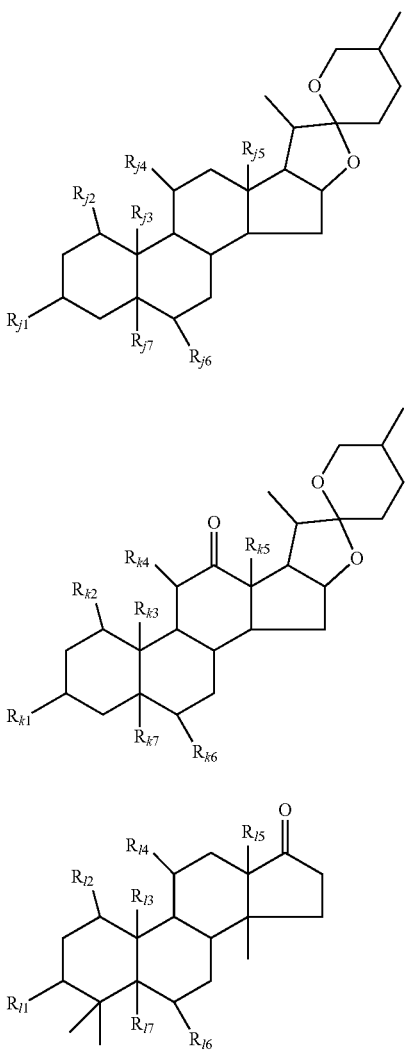

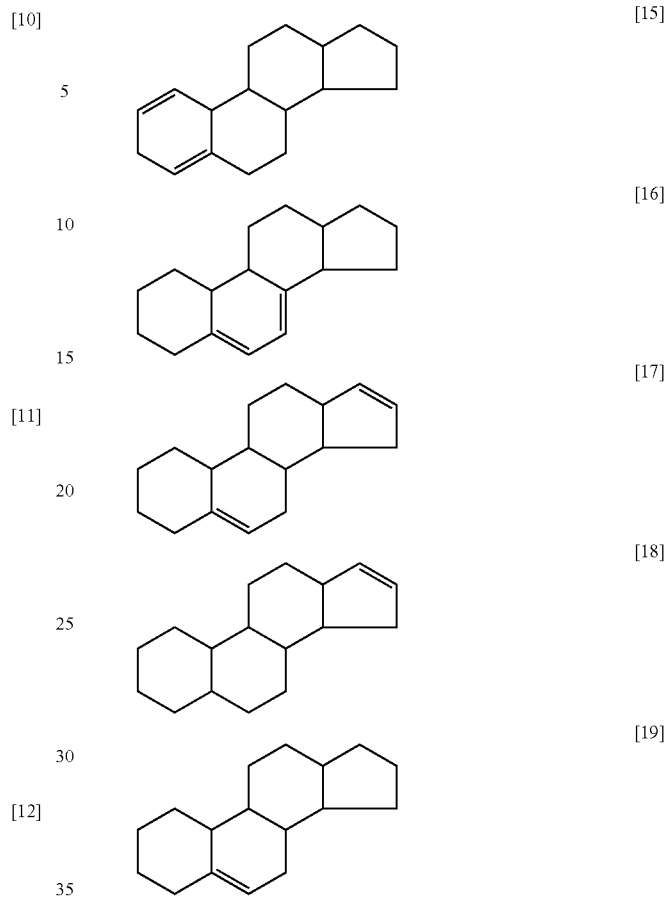

Further, examples of the structures of the alicyclic portion of formulas [1] to [12] include, but not limited to, the structures shown below in formulas [13] to [19], including alicyclic structures formed from a cyclopentanoperhydrophenanthrene nucleus, and structures in which a portion of those alicyclic structures include an unsaturated double bond.

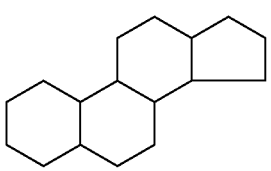

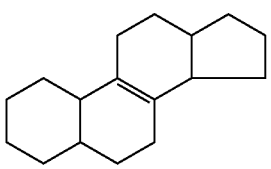

In the above formulas [1] to [12], each of $R_{a1}$ to $R_{a9}$, $R_{b1}$ to $R_{b9}$, $R_{c1}$ to $R_{c7}$, $R_{d1}$ to $R_{d8}$, $R_{e1}$ to $R_{e9}$, $R_{f1}$ to $R_{f8}$, $R_{g1}$ to $R_{g6}$, $R_{h1}$ to $R_{h7}$, to $R_{i1}$ to $R_{i5}$, $R_{j1}$ to $R_{j7}$, $R_{k1}$ to $R_{k7}$ and $R_{l1}$ to $R_{l7}$ independently represents:

a hydrogen atom, alkyl group, alkenyl group, alkynyl group, hydroxyl group, formyl group, alkylcarbonyl group, hydroxyalkylcarbonyl group, carboxyalkylcarbonyl group, formate alkylcarbonyl group, acetoxyalkylcarbonyl group, alkylcarboxy group, hydroxyalkylcarboxy group, carboxyalkylcarboxy group, formate alkylcarboxy group, acetoxyalkylcarboxy group, alkoxy group, hydroxyalkoxy group, carboxyalkoxy group, formate alkoxy group, acetoxyalkoxy group, benzoyloxy group, or a group represented by formula [20] or formula [21] shown below.

Examples of the alkyl group include, but not limited to, a methyl group and an ethyl group. Examples of the alkenyl group include, but not limited to, a vinyl group and an allyl group. Examples of the alkynyl group include, but not limited to, an ethynyl group and a prop-2-yn-1-yl group.

The term "formate" means "—O—CH=O". In the formulas shown below, the * indicates the bonding point.

-continued

*—O(CH₂CH₂O)ₙH  [21]

(In the formula, n represents 1 to 50.)

Saponins are structures in which a sugar is bonded to a steroid nucleus, and one example is solanine, which is represented by formula [22] shown below, although saponins are not restricted to this particular structure. Examples of the type of sugar include, but not limited to, D-glucose, D-galactose, L-arabinose and D-rhamnose.

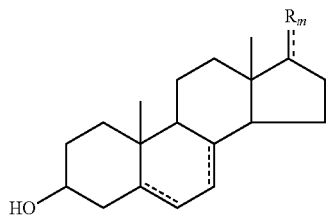
[23]

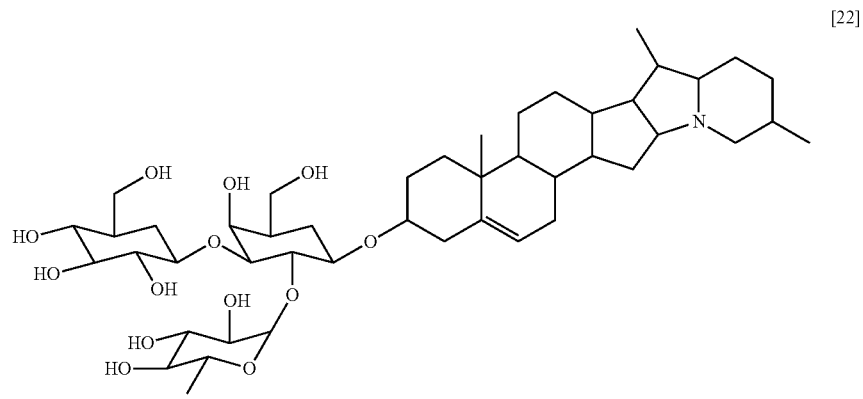 [SMILES: CC1CCC2C(C)C3C4CCC5C(CC=C6CC(OC7CC(CO)C(O)C(OC8CC(CO)C(O)C(O)C8O)C7OC7OC(C)C(O)C(O)C7O)CCC65C)C4CC3N2C1]
[22]

Among the various compounds (C) having a steroid skeleton, a compound (C1) having a steroid skeleton with a hydroxyl group is preferred, a compound (C1-2) having a steroid skeleton with a single hydroxyl group is more preferred, and a compound (C1-3) having a steroid skeleton with a single secondary hydroxyl group is even more preferred. By including a hydroxyl group, the compound (C) can be partially incorporated within the crosslinking reaction between the acrylic polymer (A) and the polyfunctional isocyanate compound (B), thereby improving the curved surface adhesiveness and the constant load peeling properties. In particular, when the compound (C) has a single hydroxyl group, excessive crosslinking can be suppressed, and the anchoring effect to the substrate and the adherend, and the compatibility with the acrylic polymer (A) can be improved. Moreover, when the compound (C) has a single secondary hydroxyl group, the amount of the compound (C) incorporated in the crosslinking reaction can be more easily controlled, which is particularly desirable.

Specific examples of the compound (C1) having a steroid skeleton with a hydroxyl group include compounds of the above formulas [1] to [12] in which the substituents $R_{a1}$ to $R_{a9}$, $R_{b1}$ to $R_{b9}$, $R_{c1}$ to $R_{c7}$, $R_{d1}$ to $R_{d8}$, $R_{e1}$ to $R_{e9}$, $R_{f1}$ to $R_{f8}$, $R_{g1}$ to $R_{g6}$, $R_{h1}$ to $R_{h7}$, $R_{i1}$ to $R_{i5}$, $R_{j1}$ to $R_{j7}$, $R_{k1}$ to $R_{k7}$ and $R_{l1}$ to $R_{l7}$ include at least one of hydroxyl group, hydroxyalkylcarbonyl group, hydroxyalkylcarboxy group, hydroxyalkoxy group and/or a group of formula [21], as well as saponins. Among these, compounds represented by formulas [23] to [31] shown below are preferred. (In the formulas, the dashed lines indicate a bond that may be a C=C double bond.)

-continued

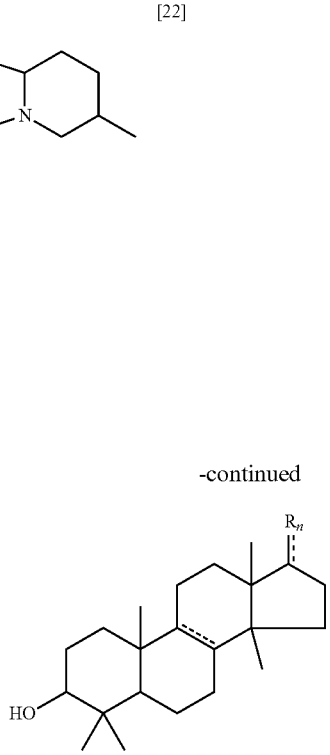
[24]

[25]

[26]

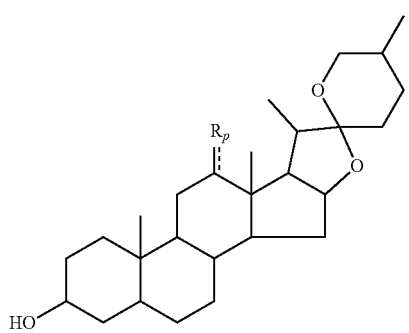

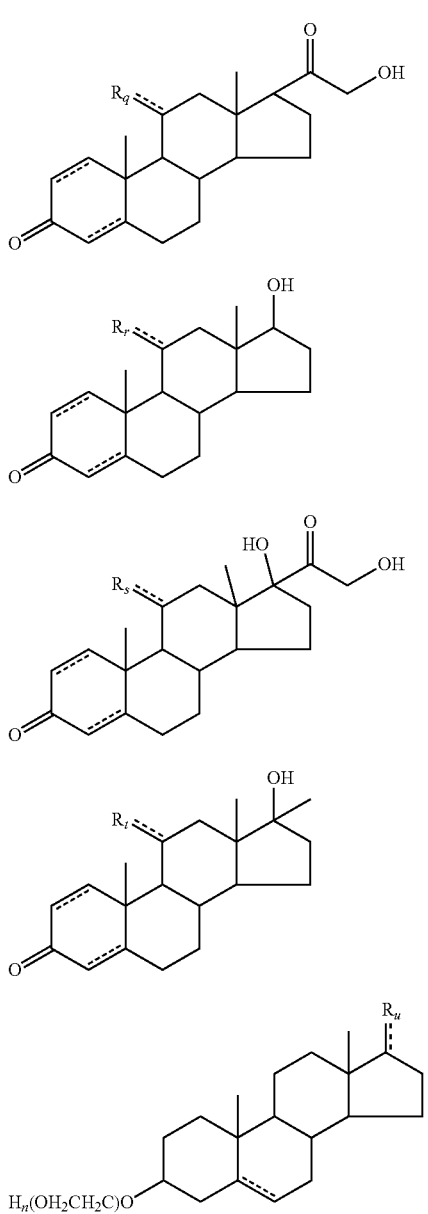

(In the above formula, n represents 1 to 50.)

In the above formulas [23] to [31], each of $R_m$ to $R_u$ independently represents:

a hydrogen atom, oxygen atom, alkyl group, alkenyl group, alkynyl group, hydroxyl group, formyl group, alkylcarbonyl group, hydroxyalkylcarbonyl group, carboxyalkylcarbonyl group, formate alkylcarbonyl group, acetoxyalkylcarbonyl group, alkylcarboxy group, hydroxyalkylcarboxy group, carboxyalkylcarboxy group, formate alkylcarboxy group, acetoxyalkylcarboxy group, alkoxy group, hydroxyalkoxy group, carboxyalkoxy group, formate alkoxy group, acetoxyalkoxy group, benzoyloxy group, or a group represented by formula [20] or formula [21] shown above.

Specific examples of the compound (C1-2) having a steroid skeleton with a single hydroxyl group include compounds of the above formulas [1] to [12] in which one of the substituents $R_{a1}$ to $R_{a9}$, $R_{b1}$ to $R_{b9}$, $R_{c1}$ to $R_{c7}$, $R_{d1}$ to $R_{d8}$, $R_{e1}$ to $R_{e9}$, $R_{f1}$ to $R_{f8}$, $R_{g1}$ to $R_{g6}$, $R_{h1}$ to $R_{h7}$, $R_{i1}$ to $R_{i5}$, $R_{j1}$ to $R_{j7}$, $R_{k1}$ to $R_{k7}$ or $R_{l1}$ to $R_{l7}$ is a hydroxyl group, hydroxyalkylcarbonyl group, hydroxyalkylcarboxy group, hydroxyalkoxy group or a group of formula [21].

Among these, compounds of the above formulas [23] to [31] in which each of the substituents $R_m$ to $R_u$ represents:

a hydrogen atom, oxygen atom, alkyl group, alkenyl group, alkynyl group, formyl group, alkylcarbonyl group, carboxyalkylcarbonyl group, formate alkylcarbonyl group, acetoxyalkylcarbonyl group, alkylcarboxy group, carboxyalkylcarboxy group, formate alkylcarboxy group, acetoxyalkylcarboxy group, alkoxy group, carboxyalkoxy group, formate alkoxy group, acetoxyalkoxy group, benzoyloxy group, or a group represented by formula [20] shown above are preferred.

The compounds of the above formulas [1] to [12] are preferably compounds in which the substituents $R_{a1}$ to $R_{a9}$, $R_{b1}$ to $R_{b9}$, $R_{c1}$ to $R_{c7}$, $R_{d1}$ to $R_{d8}$, $R_{e1}$ to $R_{e9}$, $R_{f1}$ to $R_{f8}$, $R_{g1}$ to $R_{g6}$, $R_{h1}$ to $R_{h7}$, $R_{i1}$ to $R_{i5}$, $R_{j1}$ to $R_{j7}$, $R_{k1}$ to $R_{k7}$ and $R_{l1}$ to $R_{l7}$ preferably include at least one of alkyl group, alkenyl group and/or alkynyl group having a carbon number of 5 or greater, and more preferably include at least one of alkyl group, alkenyl group and/or alkynyl group having a carbon number of 5 to 20.

Further, the compounds of the above formulas [23] to [31] are preferably compounds in which each of the substituents $R_m$ to $R_u$ preferably represents an alkyl group, alkenyl group and/or alkynyl group having a carbon number of 5 or greater, and more preferably represents an alkyl group, alkenyl group and/or alkynyl group having a carbon number of 5 to 20.

When the compound (C) has at least one of alkyl group, alkenyl group and/or alkynyl group having a carbon number of 5 or greater as a substituent, the curved surface adhesiveness and the constant load peeling properties can be improved, and the compatibility with the acrylic polymer (A) can also be improved.

The molecular weight of the compound (C) having a steroid skeleton is preferably within a range from 250 to 800, and is more preferably from 300 to 500. Provided the molecular weight is at least 250, satisfactory cohesive force can be obtained, and the curved surface adhesiveness and the constant load peeling properties can be improved. Provided the molecular weight is not more than 800, excessive cohesive force can be suppressed, and any deterioration in the adhesive force can be suppressed.

Specific examples of the compound (C) having a steroid skeleton described above include, but not limited to:

compounds having a steroid skeleton with a single primary hydroxyl group such as desoxycorticosterone and 11-dehydrocorticosterone, compounds having a steroid skeleton with a single secondary hydroxyl group such as cholesterol, β-sitosterol, campesterol, stigmasterol, brassicasterol, lanosterol, ergosterol, β-cholestanol, testosterone, estrone, dehydroepiandrosterone, coprostanol, pregnenolone, epicholestanol, 7-dehydrocholesterol, estradiol benzoate, tigogenin and hecogenin, compounds having a steroid skeleton with a single tertiary hydroxyl group such as methandienone, cortisone acetate and stenolone, compounds having a steroid skeleton with no hydroxyl group such as 1,4-androstadien-3,17-dione, 4-androstene-3, 17-dione, deoxycorticosterone acetate, cholesterol acetate, (22E)-stigmasta-5,22-dien-3β-ol acetate, progesterone, 20-oxopregna-5,16-dien-3β-yl acetate, 4-adrostene-3,11,17-trione, 5α-androstane, cholestane, pregnane and estrane, and compounds having a steroid skeleton with multiple hydroxyl groups such as β-estradiol, α-estradiol, bolandiol, methylandrostenediol, cortisone, prednisone, corticosterone, aldosterone, 18-hydroxycorticosterone, 4-androstene-11α,17β-diol-3-one, 4-androstene-16α,17β-diol-3-one, hyodeoxycholic acid, digitoxigenin and solanine.

Among these compounds, compounds having a steroid skeleton with a single primary hydroxyl group, compounds having a steroid skeleton with a single secondary hydroxyl group, and compounds having a steroid skeleton with a single tertiary hydroxyl group are preferred, compounds having a steroid skeleton with a single secondary hydroxyl group are more preferred, and cholesterol, β-sitosterol, campesterol, stigmasterol, brassicasterol, lanosterol, ergosterol, β-cholestanol, coprostanol, epicholestanol and 7-dehydrocholesterol are further more preferred, as they have a single secondary hydroxyl group, have a molecular weight within a range from 300 to 500, and have an alkyl group, alkenyl group and/or alkynyl group with a carbon number of 5 or greater.

These compounds (C) having a steroid skeleton may be used individually, or a combination of two or more compounds may be used. Examples of mixtures of two or more compounds include, but not limited to, phytosterols, which are mixtures of β-sitosterol, campesterol, stigmasterol and/or brassicasterol or the like.

Embodiment 1 (Adhesive for Label)

The amount of the compound (C) having a steroid skeleton within the adhesive composition is set so that the mass of the compound (C) having a steroid skeleton per 100 parts by mass of the acrylic polymer (A) is within a range from 0.1 to 20 parts by mass, preferably from 0.5 to 20 parts by mass, more preferably from 0.8 to 10 parts by mass, and even more preferably from 1.0 to 5.0 parts by mass. By ensuring that the amount of the compound (C) having a steroid skeleton satisfies the above range, favorable curved surface adhesiveness can be obtained.

Further, the amount of the compound (C) having a steroid skeleton within the adhesive composition is set so that the mass of the compound (C) having a steroid skeleton per 100 parts by mass of the adhesive composition is preferably within a range from 0.2 to 13 parts by mass, more preferably from 0.4 to 6.0 parts by mass, and even more preferably from 0.6 to 4.0 parts by mass.

Embodiment 2 (Adhesive for Automobile)

The amount of the compound (C) having a steroid skeleton within the adhesive composition is set so that the mass of the compound (C) having a steroid skeleton per 100 parts by mass of the acrylic polymer (A) is within a range from 0.1 to 20 parts by mass, preferably from 0.5 to 20 parts by mass, and more preferably from 2.0 to 13 parts by mass. By ensuring that the amount of the compound (C) having a steroid skeleton satisfies this range, favorable constant load peeling properties can be obtained.

Further, the amount of the compound (C) having a steroid skeleton within the adhesive composition is set so that the mass of the compound (C) having a steroid skeleton per 100 parts by mass of the adhesive composition is preferably within a range from 0.2 to 13 parts by mass, and more preferably from 1.0 to 8.0 parts by mass.

<Acrylic Polymer (A)>

The acrylic polymer (A) of the present invention refers to a polymer or copolymer of a monomer having an ethylenic unsaturated bond that includes at least a (meth)acrylate ester monomer, and describes an acrylic polymer having hydroxyl groups and/or carboxyl groups. Here, the term "(meth)acrylate ester monomer" is a generic term that includes the meanings of both "acrylate ester monomer" and "methacrylate ester monomer".

Examples of the (meth)acrylate ester monomer include, but not limited to, methyl (meth)acrylate, ethyl (meth)acrylate, propyl (meth)acrylate, butyl (meth)acrylate, isobutyl (meth)acrylate, pentyl (meth)acrylate, hexyl (meth)acrylate, cyclohexyl (meth)acrylate, decyl (meth)acrylate, dodecyl (meth)acrylate, myristyl (meth)acrylate, palmityl (meth)acrylate and stearyl (meth)acrylate. Among these, butyl acrylate and 2-ethylhexyl acrylate are preferred, as they tend to yield suitable adhesive properties more easily, and facilitate the production of an acrylic polymer having a comparatively large weight-average molecular weight.

The acrylic polymer (A) has hydroxyl groups and/or carboxyl groups that can react with the isocyanate groups of the polyfunctional isocyanate compound (B) described below. There are no particular limitations on the method used for introducing the hydroxyl groups and/or carboxyl groups, and for example, an acrylic polymer (A) having hydroxyl groups and/or carboxyl groups can be obtained by copolymerizing the (meth)acrylate ester monomer with a monomer having a reactive functional group and an ethylenic unsaturated bond, such as a monomer having a hydroxyl group and an ethylenic unsaturated bond and/or a monomer having a carboxyl group and an ethylenic unsaturated bond.

Examples of the monomer having a hydroxyl group and an ethylenic unsaturated bond include, but not limited to, hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate and 4-hydroxybutyl (meth)acrylate.

Examples of the monomer having a carboxyl group and an ethylenic unsaturated bond include, but not limited to, carboxylic acids having an unsaturated bond, such as (meth)acrylic acid, 2-carboxyethyl (meth)acrylate, crotonic acid, maleic acid, itaconic acid, fumaric acid, citraconic acid and mesaconic acid.

Besides the monomers described above, other monomers having an ethylenic unsaturated bond and a functional group other than a hydroxyl group and/or a carboxyl group may also be used, provided they do not impair the adhesive properties. Examples of these monomers having an ethylenic unsaturated bond and a functional group other than a hydroxyl group and/or a carboxyl group include, but not limited to, monomers having an epoxy group and an ethylenic unsaturated bond, monomers having an amino group and an ethylenic unsaturated bond, and monomers having an isocyanate group and an ethylenic unsaturated bond.

Specific examples of monomers having an epoxy group and an ethylenic unsaturated bond include, but not limited to, glycidyl (meth)acrylate, methylglycidyl (meth)acrylate, 3,4-epoxycyclohexylmethyl (meth)acrylate and 6-methyl-3,4-epoxycyclohexylmethyl (meth)acrylate.

Specific examples of monomers having an amino group and an ethylenic unsaturated bond include, but not limited to, monoalkylamin (meth)acrylates such as monomethylaminoethyl (meth)acrylate, monoethylaminoethyl (meth)

acrylate, monomethylaminopropyl (meth)acrylate and monoethylaminopropyl (meth)acrylate.

Specific examples of monomers having an isocyanate group and an ethylenic unsaturated bond include, but not limited to, 2-isocyanatoethyl (meth)acrylate and the like.

Further, other monomers having an ethylenic unsaturated bond besides those described above may also be used, including, but not limited to, (meth)acrylamides such as (meth)acrylamide, N-methyl (meth)acrylamide and N-methylol (meth)acrylamide, as well as vinyl acetate, vinyl crotonate, styrene and acrylonitrile.

The aforementioned monomers having an ethylenic unsaturated bond may be used individually, or a combination of two or more monomers may be used.

The characteristic feature of the acrylic polymer (A) is that it contains hydroxyl groups and/or carboxyl groups, but of the various possibilities, the acrylic polymer (A) preferably contains hydroxyl groups. When the acrylic polymer (A) has hydroxyl groups, sufficient crosslinking is formed, and a combination of superior cohesive force and favorable adhesive properties can be achieved.

Moreover, by ensuring that the acrylic polymer (A) has hydroxyl groups, even if the compound (C) having a steroid skeleton has a hydroxyl group, a satisfactory level of crosslinking with the isocyanate groups of the polyfunctional isocyanate compound (B) can still be formed.

The proportion of the monomer having a hydroxyl group and/or carboxyl group and an ethylenic unsaturated bond, within the 100% by mass of all the monomers that constitute the acrylic polymer (A), is preferably within a range from 0.05 to 20% by mass, and is more preferably from 0.1 to 10% by mass. Provided the proportion is at least 0.05% by mass, sufficient crosslinking is formed, and a combination of superior cohesive force and favorable adhesive properties can be achieved. Provided the proportion is not more than 20% by mass, any increase in the glass transition temperature can be suppressed, and favorable adhesive properties can be obtained.

Among the various possibilities, the proportion of the monomer having a hydroxyl group and an ethylenic unsaturated bond, within the 100% by mass of all the monomers that constitute the acrylic polymer (A), is preferably within a range from 0.05 to 10% by mass, and is more preferably from 0.08 to 5% by mass. Provided the proportion of the monomer having a hydroxyl group and an ethylenic unsaturated bond satisfies this range, the curved surface adhesiveness and the constant load peeling properties can be improved.

The weight-average molecular weight of the acrylic polymer (A), measured by gel permeation chromatography (GPC) and referenced against standard polystyrenes, is preferably within a range from 300,000 to 1,500,000, and more preferably from 400,000 to 1,000,000. Provided the weight-average molecular weight is at least 300,000, satisfactory cohesive force and durability can be obtained. Provided the weight-average molecular weight is not higher than 1,500,000, any increase in viscosity can be suppressed, and favorable coatability can be achieved.

Further, the glass transition temperature of the acrylic polymer (A) is preferably within a range from −60 to 0° C., and more preferably from −50 to −10° C. Provided the glass transition temperature is at least −60° C., satisfactory cohesive force can be obtained, and the adhesive force and the durability can be enhanced. Provided the glass transition temperature is not higher than 0° C., satisfactory wetting properties can be achieved, and the adhesive force can be improved. Accordingly, by ensuring that the glass transition temperature of the acrylic polymer (A) satisfies the above range, well-balanced adhesive properties (and in particular, a good combination of tack and cohesive force) can be achieved when the acrylic polymer (A) is used to form an adhesive sheet.

There are no particular limitations on the method used for producing the acrylic polymer (A), and for example, the acrylic polymer (A) can be obtained by polymerizing the ethylenic unsaturated bond-containing monomers described above in a conventional radical polymerization reaction. Although the reaction may be performed without a solvent, from the viewpoints of synthesis stability and ease of handling, a solvent is preferably used. Further, from the viewpoint of controlling the molecular weight, a radical polymerization initiator (hereafter sometimes abbreviated as simply the "polymerization initiator") is also preferably used. Other conventional additives such as a chain transfer agent may also be used.

Examples of the solvent used during the polymerization include, but not limited to, acetone, methyl acetate, ethyl acetate, propyl acetate, toluene, xylene, anisole, methyl ethyl ketone, cyclohexanone and isopropanol. There are no particular limitations on the solvent, and a single solvent may be used alone, or a combination of two or more solvents may be used.

Examples of the polymerization initiator used during the polymerization include, but not limited to, organic peroxides such as benzoyl peroxide, tert-butyl peroxybenzoate, cumene hydroperoxide, diisopropyl peroxydicarbonate, di-n-propyl peroxydicarbonate, di(2-ethoxyethyl) peroxydicarbonate, tert-butyl peroxy-2-ethylhexanoate, tert-butyl peroxyneodecanoate, tert-butyl peroxypivalate, (3,5,5-trimethylhexanoyl) peroxide, dipropionyl peroxide and diacetyl peroxide, and azo-based compounds such as 2,2'-azobisisobutyronitrile, 2,2'-azobis(2-methylbutyronitrile), 1,1'-azobis(cyclohexane-1-carbonitrile), 2,2'-azobis(2,4-dimethylvaleronitrile), 2,2'-azobis(2,4-dimethyl-4-methoxyvaleronitrile), dimethyl 2,2'-azobis(2-methylpropionate), 4,4'-azobis(4-cyanovaleric acid), 2,2'-azobis(2-hydroxymethylpropionitrile) and 2,2'-azobis[2-(2-imidazolin-2-yl)propane].

These polymerization initiators may be used individually, or a combination of two or more polymerization initiators may be used.

Moreover, a chain transfer agent may be used for the purpose of regulating the molecular weight of the acrylic polymer (A). Examples of the chain transfer agent include, but not limited to, alkyl mercaptans such as octyl mercaptan, nonyl mercaptan, decyl mercaptan and dodecyl mercaptan, thioglycolate esters such as octyl thioglycolate, nonyl thioglycolate and 2-ethylhexyl thioglycolate, as well as 2,4-diphenyl-4-methyl-1-pentene, 1-methyl-4-isopropylidene-1-cyclohexene, α-pinene and β-pinene. Of these, thioglycolate esters, 2,4-diphenyl-4-methyl-1-pentene, 1-methyl-4-isopropylidene-1-cyclohexene, α-pinene and β-pinene are particularly preferred in terms of achieving low odor of the product polymer. The amount used of the chain transfer agent, is preferably not more than 3% by mass of the 100% by mass of all the monomers that constitute the acrylic polymer (A).

<Polyfunctional Isocyanate Compound (B)>

The polyfunctional isocyanate compound (B) undergoes a crosslinking reaction with the hydroxyl groups and/or carboxyl groups of the acrylic polymer (A), thereby forming a network-like crosslinked structure, and is used for the purpose of imparting the high elasticity and substrate adhesiveness required for use as an adhesive. There are no particular limitations on the polyfunctional isocyanate compound (B), provided it is capable of forming crosslinked structures with the hydroxyl groups and/or carboxyl groups of the acrylic polymer (A), and examples include aromatic-based isocyanates, aliphatic-based isocyanates and alicyclic-based isocyanates, as well as difunctional or higher isocyanate compounds such as biurets, nurates and adducts of the above isocyanates.

Examples of the aromatic-based isocyanates include, but not limited to, 1,3-phenylene diisocyanate, 4,4'-diphenyl diisocyanate, 1,4-phenylene diisocyanate, 4,4'-diphenylmethane diisocyanate, 2,4-tolylene diisocyanate, 2,6-tolylene diisocyanate, 4,4'-toluidine diisocyanate, 2,4,6-triisocyanatotoluene, 1,3,5-triisocyanatobenzene, dianisidine diisocyanate, 4,4'-diphenyl ether diisocyanate, 4,4',4"-triphenylmethane triisocyanate, ω,ω-diisocyanato-1,3-dimethylbenzene (alternative names: XDI, m-xylylene diisocyanate), ω,ω'-diisocyanato-1,4-dimethylbenzene (alternative name: p-xylylene diisocyanate), ω,ω'-diisocyanato-1,4-diethylbenzene, 1,4-tetramethylxylylene diisocyanate, and 1,3-tetramethylxylylene diisocyanate.

Examples of the aliphatic-based isocyanates include, but not limited to, trimethylene diisocyanate, tetramethylene diisocyanate, hexamethylene diisocyanate (alternative name: HMDI), pentamethylene diisocyanate, 1,2-propylene diisocyanate, 2,3-butylene diisocyanate, 1,3-butylene diisocyanate, dodecamethylene diisocyanate and 2,4,4-trimethylhexamethylene diisocyanate.

Examples of the alicyclic-based isocyanates include, but not limited to, 3-isocyanatomethyl-3,5,5-trimethylcyclohexyl isocyanate (alternative names: IPDI, isophorone diisocyanate), 1,3-cyclopentane diisocyanate, 1,3-cyclohexane diisocyanate, 1,4-cyclohexane diisocyanate, methyl-2,4-cyclohexane diisocyanate, methyl-2,6-cyclohexane diisocyanate, 4,4'-methylenebis(cyclohexyl isocyanate) and 1,4-bis(isocyanatomethyl)cyclohexane.

Examples of biurets include, but not limited to, the biuret of hexamethylene diisocyanate (product name: "Sumidur N-75", manufactured by Sumika Bayer Urethane Co., Ltd., and product name: "Duranate 24A-90CX", manufactured by Asahi Kasei Corporation).

Examples of nurates include, but not limited to, the nurate of hexamethylene diisocyanate (product name: "Sumidur N-3300", manufactured by Sumika Bayer Urethane Co., Ltd.), the nurate of isophorone diisocyanate (product name: "Desmodur Z-4370", manufactured by Sumika Bayer Urethane Co., Ltd.), and the nurate of tolylene diisocyanate (product name: "Coronate 2030", manufactured by Nippon Polyurethane Industry Co., Ltd.).

Examples of adducts include difunctional or higher isocyanate compounds obtained by reacting an aforementioned aromatic-based isocyanate, aliphatic-based isocyanate and/or alicyclic-based isocyanate with a difunctional or higher low-molecular weight active hydrogen-containing compound, and specific examples include, but not limited to, a trimethylolpropane hexamethylene diisocyanate adduct (product name: "Takenate D-160N", manufactured by Mitsui Chemicals, Inc.), a trimethylolpropane tolylene diisocyanate adduct (product name: "Coronate L", manufactured by Nippon Polyurethane Industry Co., Ltd., and product name: "Takenate D-102" manufactured by Mitsui Chemicals, Inc.), a trimethylolpropane xylylene diisocyanate adduct (product name: "Takenate D-110N", manufactured by Mitsui Chemicals, Inc.), and a trimethylolpropane isophorone diisocyanate adduct (product name: "Takenate D-140N", manufactured by Mitsui Chemicals, Inc.).

Examples of the difunctional or higher low-molecular weight active hydrogen-containing compound include, but not limited to, aliphatic or alicyclic diols such as ethylene glycol, propylene glycol, diethylene glycol, butylene glycol, 1,6-hexane glycol, 3-methyl-1,5-pentanediol, 3,3'-dimethylolheptane, 2-methyl-1,8-octanediol, 2 butyl-2-ethyl-1,3-propanediol, polyoxyethylene glycol (number of added moles: not more than 10), polyoxypropylene glycol (number of added moles: not more than 10), 1,4-butanediol, 1,5-pentanediol, 1,6-hexanediol, 1,8-octanediol, 1,9-nonanediol, neopentyl glycol, butylethylpentanediol, 2-ethyl-1,3-hexanediol, cyclohexanediol, cyclohexanedimethanol, tricyclodecanedimethanol, cyclopentadienedimethanol, and dimer diol, aromatic diols such as 1,3-bis(2-hydroxyethoxy)benzene, 1,2-bis(2-hydroxyethoxy)benzene, 1,4-bis(2-hydroxyethoxy)benzene, 4,4'-methylenediphenol, 4,4'-(2-norbornylidene)diphenol, 4,4'-dihydroxybiphenol, o-, m—and p-dihydroxybenzene, 4,4'-isopropylidenephenol, and bisphenols obtained by adding an alkylene oxide such as ethylene oxide or propylene oxide to a bisphenol such as bisphenol A or bisphenol F, trimethylol branched alkanes such as 1,1,1-trimethylolpropane, 1,1,1-trimethylolbutane, 1,1,1-trimethylolpentane, 1,1,1-trimethylolhexane, 1,1,1-trimethylolheptane, 1,1,1-trimethyloloctane, 1,1,1-trimethylolnonane, 1,1,1-trimethyloldecane, 1,1,1-trimethylolundecane, 1,1,1-trimethyloldodecane, 1,1,1-trimethyloltridecane, 1,1,1-trimethyloltetradecane, 1,1,1-trimethylolpentadecane, 1,1,1-trimethylolhexadecane, 1,1,1-trimethylolheptadecane, 1,1,1-trimethyloloctadecane, 1,1,1-trimethylolnonadecane, 1,1,1-trimethylol-sec-butane, 1,1,1-trimethylol-tert-pentane, 1,1,1-trimethylol-tert-nonane, 1,1,1-trimethylol-tert-tridecane, 1,1,1-trimethylol-tert-heptadecane, 1,1,1-trimethylol-2-methyl-hexane, 1,1,1-trimethylol-3-methyl-hexane, 1,1,1-trimethylol-2-ethyl-hexane, 1,1,1-trimethylol-3-ethyl-hexane and 1,1,1-trimethylol-isoheptadecane, tri functional polyols such as trimethylolbutene, trimethylolpentene, trimethylolhexene, trimethylolheptene, trimethyloloctene, trimethyloldecene, trimethyloldocene, trimethyloltridecene, trimethylolpentadecene, trimethylolhexadecene, trimethylolheptadecene, trimethyloloctadecene, 1,2,6-butanetriol, 1,2,4-butanetriol and glycerol, tetrafunctional or higher polyols such as pentaerythritol, dipentaerythritol, sorbitol and xylitol, and aliphatic polyamines such as triethylenetetramine, diethylenetriamine and triaminopropane. These difunctional or higher low-molecular weight active hydrogen-containing compounds may be used individually, or a combination of two or more such compounds may be used.

In the present invention, a single polyfunctional isocyanate compound (B) may be used alone, or a combination of two or more compounds may be used.

Among the various polyfunctional isocyanate compounds (B), if due consideration is given to the adhesive properties, heat resistance and compatibility and the like, then use of a trifunctional isocyanate compound is preferred, and a trimethylolpropane adduct of tolylene diisocyanate, trimethylolpropane adduct of hexamethylene diisocyanate, trimethylolpropane adduct of isophorone diisocyanate, trimethylolpropane adduct of xylylene diisocyanate, isocyanurate of tolylene diisocyanate, isocyanurate of hexamethylene diisocyanate or isocyanurate of isophorone diisocyanate is more preferred, and a trimethylolpropane adduct of tolylene diisocyanate or a trimethylolpropane adduct of xylylene diisocyanate is further more preferred.

Embodiment 1 (Adhesive for Label)

The amount used of the polyfunctional isocyanate compound (B) in the present invention is set so that the molar ratio between the isocyanate groups in the polyfunctional isocyanate compound (B) and the combined total of the hydroxyl groups and/or carboxyl groups in the acrylic polymer (A) and the hydroxyl groups in the compound (C) having a steroid skeleton (isocyanate groups/(hydroxyl groups and carboxyl groups)) is preferably within a range from 0.05 to 1.5, and more preferably from 0.1 to 0.8. Provided this ratio is at least 0.05, sufficient crosslinking is formed, and a high level of cohesive force and good adhesive force and heat resistance are obtained, whereas provided the ratio is not more than 1.5, excessive cohesive force due to an overly high degree of crosslinking can be suppressed, and good adhesiveness to the adherend can be achieved.

Further, in a more preferred embodiment, the molar ratio between the isocyanate groups in the polyfunctional isocyanate compound (B) and the combined total of the hydroxyl groups in the acrylic polymer (A) and the hydroxyl groups in the compound (C) having a steroid skeleton (isocyanate groups/hydroxyl groups) is preferably within a range from 0.05 to 1.5, and more preferably from 0.1 to 0.8.

Embodiment 2 (Adhesive for Automobile)

In the case of an adhesive for an automobile, the amount used of the polyfunctional isocyanate compound (B) in the present invention is set so that the molar ratio between the isocyanate groups in the polyfunctional isocyanate compound (B), and the combined total of the hydroxyl groups and/or carboxyl groups in the acrylic polymer (A), the hydroxyl groups in the compound (C) having a steroid skeleton, and the hydroxyl groups in the tackifier described below (isocyanate groups/(hydroxyl groups and/or carboxyl groups)) is preferably within a range from 0.05 to 4.0, and more preferably from 0.3 to 2.0. Provided this ratio is at least 0.05, sufficient crosslinking is formed, and a high level of cohesive force and good constant load peeling properties and heat resistance are obtained, whereas provided the ratio is not more than 4.0, excessive cohesive force due to an overly high degree of crosslinking can be suppressed, and good adhesiveness to the adherend can be achieved.

Further, in a more preferred embodiment, the molar ratio between the isocyanate groups in the polyfunctional isocyanate compound (B) and the combined total of the hydroxyl groups in the acrylic polymer (A), the hydroxyl groups in the compound (C) having a steroid skeleton and the hydroxyl groups in the tackifier described below (isocyanate groups/hydroxyl groups) is preferably within a range from 0.5 to 4.0, and more preferably from 0.8 to 2.5.

<Silane Coupling Agent (E)>

The adhesive composition of the present invention may also contain a silane coupling agent (E).

Although not limited to the following examples, specific examples of the silane coupling agent (E) include aminosilanes such as γ-aminopropyltrimethoxysilane, γ-aminopropyltriethoxysilane, N-β-(aminoethyl)-γ-aminopropyltrimethoxysilane, N-β-(aminoethyl)-γ-aminopropyltriethoxysilane, N-β-(aminoethyl)-γ-aminopropylmethyldimethoxysilane, γ-triethoxysilyl-N-(α,γ-dimethyl-butylidene)propylamine, N-phenyl-γ-aminopropyltrimethoxysilane, and N-(vinylbenzyl)-β-aminoethyl-γ-aminopropyltrimethoxysilane hydrochloride, epoxysilanes such as β-(3,4-epoxycyclohexyl)ethyltrimethoxysilane, γ-glycidoxypropyltrimethoxysilane, γ-glycidoxypropyltriethoxysilane, γ-glycidoxypropylmethyldimethoxysilane and γ-glycidoxypropylmethyldiethoxysilane, vinylsilanes such as vinyltrimethoxysilane, vinyltriethoxysilane, vinyltris(β-methoxyethoxy)silane, γ-methacryloxypropyltrimethoxysilane, γ-methacryloxypropyltriethoxysilane and p-styryltrimethoxysilane, (meth)acrylic silanes such as γ-methacryloxypropylmethyldimethoxysilane, γ-methacryloxypropylmethyldiethoxysilane and γ-acryloxypropyltrimethoxysilane, alkoxysilanes such as methyltrimethoxysilane, dimethyldimethoxysilane, phenyltrimethoxysilane, methyltriethoxysilane, dimethyldiethoxysilane, phenyltriethoxysilane, n-propyltrimethoxysilane, n-propyltriethoxysilane, hexyltrimethoxysilane, hexyltriethoxysilane, octyltriethoxysilane, decyltrimethoxysilane, 1,6-bis(trimethoxysilyl)hexane, trifluoropropyltrimethoxysilane and tris(trimethoxysilylpropyl)isocyanurate, as well as γ-ureidopropyltrialkoxysilanes, γ-mercaptopropyltrimethoxysilane, γ-mercaptopropylmethyldimethoxysilane, bis(triethoxysilylpropyl) tetrasulfide, γ-isocyanatopropyltriethoxysilane and hexamethyldisilazane. These silane coupling agents may be used individually, or a combination of two or more silane coupling agents may be used.

Among the various silane coupling agents (E), if due consideration is given to the adhesiveness to the adherend and the heat resistance and the like, then use of an epoxysilane or alkoxysilane is preferred, and an epoxysilane is further more preferred.

The amount used of the silane coupling agent (E) is preferably within a range from 0.1 to 10 parts by mass, and more preferably from 0.5 to 5 parts by mass, per 100 parts by mass of the acrylic polymer (A). By ensuring that the amount of the silane coupling agent (E) satisfies this range, the adhesive force can be improved.

The adhesive composition of the present invention may also include conventional additives according to need, including tackifiers, catalysts, antioxidants, ultraviolet absorbers, hydrolysis inhibitors, antifungal agents, thickeners, plasticizers, fillers and antifoaming agents.

Known tackifiers may be used, including terpene resins, aliphatic-based petroleum resins, aromatic-based petroleum resins, coumarone-indene resins, phenol resins, terpene-phenol resins, rosin derivatives (including rosin, polymerized rosin, hydrogenated rosin, esterified products of these derivatives with a polyhydric alcohol such as glycerol or pentaerythritol, and resin acid dimers), and acrylic resins. The amount used of the tackifier is preferably from 0 to 60 parts by mass, more preferably from 10 to 40 parts by mass, and even more preferably from 10 to 30 parts by mass, per 100 parts by mass of the acrylic polymer (A). By ensuring that the amount of the tackifier satisfies this range, satisfactory adhesive force can be achieved.

There are no particular limitations on the types of acrylic resins that can be used as the tackifier, provided the resin is different from the acrylic polymer (A), but in terms of achieving good compatibility with the acrylic polymer (A), an acrylic resin with a weight-average molecular weight of not more than 50,000 obtained by polymerizing an ethylenic unsaturated bond-containing monomer that includes a (meth)acrylate ester monomer is preferred.

A catalyst may be used for the purpose of regulating the curing time for the adhesive composition, and although there are no particular limitations on the catalyst, examples include conventional tertiary amines and organometallic compounds and the like.

Examples of the tertiary amines include, but not limited to, triethylamine, tributyl amine, dimethylbenzyl amine, N-methylmorpholine, N-ethylmorpholine, N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, bis(dimethylaminopropyl)urea, 1,4-dimethylpiperazine, 1,2-dimethylimidazole, 1-azabicyclo [3.3.0]octane, 1,4-diazabicyclo [2.2.0]octane, alkanolamine compounds, triethanolamine, triisopropanolamine, N-methyldiethanolamine, N-ethyldiethanolamine and dimethylethanolamine.

Examples of the organometallic compounds include, but not limited to, tin(II) organic carboxylate salts such as tin(II) acetate, tin(II) octoate, tin(II) ethylhexanoate and tin(II) laurate; dialkyl tin(IV) organic carboxylate salts such as dibutyltin diacetate, dibutyltin dilaurate, dibutyltin maleate, dioctyltin diacetate and dioctyltin laurate; organotitanium alkoxide compounds such as titanium tetraisopropoxide, titanium tetra-n-butoxide, titanium butoxide dimer and titanium tetra-2-ethylhexoxide; organotitanium solvent-based chelate compounds such as titanium diisopropoxybis(acetylacetonate), titanium tetraacetylacetonate, titanium di-2-ethylhexoxybis(2-ethyl-3-hydroxyhexoxide) and titanium diisopropoxybis(ethylacetoacetate); and organotitanium water-based chelate compounds such as titanium diisopropoxybis(triethanolaminate), titanium lactate ammonium salt; and titanium lactate.

In those cases where a catalyst is used in the adhesive composition of the present invention, a conventional catalytic activity inhibitor such as acetylacetone may be used for the purpose of improving the pot life of the adhesive composition.

Examples of diluents that may be used when producing or applying the adhesive composition of the present invention include, but not limited to, acetone, methyl acetate, ethyl acetate, propyl acetate, toluene, xylene, anisole, methyl ethyl ketone, cyclohexanone and isopropanol, and other solvent media may also be used. There are no particular limitations on these solvents, which may be used individually, or in combinations containing two or more solvents.

<Adhesive Sheet>

Using the adhesive composition of the present invention, a laminate (hereafter referred to as an "adhesive sheet") containing an adhesive layer laminated to a substrate can be obtained.

Conventional adhesive sheet substrates can be used as the substrate for the adhesive sheet, and examples include, but not limited to, film-like substrates such as papers, metal films, cellophane and various plastic films, as well as releasable film substrates in which the surface of one of these film-like substrates has been subjected to a release treatment with a silicone compound or a fluorine compound, and surface skin materials (D).

There are no particular limitations on the various plastic films, and examples include, but not limited to, polyhydroxyethylene films, triacetylcellulose films, films of polyolefin-based resins such as polypropylene, polyethylene, polycycloolefins and ethylene-vinyl acetate copolymers, films of polyester-based resins such as polyethylene terephthalate and polybutene terephthalate, as well as polycarbonate-based resin films, polynorbornene-based resin films, polyarylate-based resin films, propenoic acid-based films, polyphenylene sulfide resin films, polyethenylbenzene resin films, vinyl-based resin films, polyamide-based resin films, polyimide-based resin films and oxirane-based resin films.

<Surface Skin Material (D)>

There are no particular limitations on the surface skin material (D), provided it is a known material, and any of the widely used materials from automotive applications or housing building material applications can be used. Specific examples include fabrics such as leathers, cloths and non-woven fabrics, and plastic sheets and foams of polyvinyl chloride (PVC), thermoplastic rubbers and thermoplastic olefins, and these materials may be used alone, or composites of two or more materials may be used.

Examples of the leathers include vinyl chloride leathers, olefin-based elastomer (TPO) leathers and polyurethane leathers, and more specific examples include widely used soft vinyl chloride resins, olefin-based elastomers and urethane resins that have been molded into sheet-like form by calender processing or using a T-die extruder or the like. From the viewpoints of soundproofing and impact resistance, the thickness of the leather is preferably within a range from 0.2 to 1.5 mm, and the surface hardness (Shore A hardness) is preferably from 25 to 60 mm.

There are no particular limitations on the types of cloth used, provided the fabric is obtained by weaving, knitting or braiding threads, fibers, or strands or the like, and specific examples include, but not limited to, moquette, tricot, jersey and double rassel.

Specific preferred configurations of the fabric include woven fabrics and warp knit or weft knit fabrics in which the thread length A of the longest thread used in forming the fabric and the thread length B of the shortest thread satisfy the following formula.

$$1 \leq A/B \leq M$$

In the formula, M=2 in the case of a woven fabric, M=6 in the case of a warp knit fabric, and M=3 in the case of a weft knit fabric. By ensuring that the value of A/B satisfies the above formula, stretching of the fabric is reduced when the fabric is bonded to the underside of a genuine leather skin material, thereby suppressing stretching of the genuine leather.

Further, among the threads that constitute the fabric, if the fineness (denier) of the thickest thread is deemed C and the fineness (denier) of the finest thread is deemed D, then the fabric preferably satisfies the following formula.

$$1 \leq C/D \leq X$$

In the formula, X=10 in the case of a woven fabric, X=3 in the case of a warp knit fabric, and X=4 in the case of a weft knit fabric. By ensuring that the value of C/D satisfies the above formula, variation in the hardness of the fabric depending on the location within the fabric can be prevented, and fabric tension can be maintained.

Examples of the non-woven fabrics include, but not limited to, chemical fibers such as synthetic fibers and rayon, natural fibers such as cotton cloth, linen, jute and wool, as well as reclaimed fibers (collected and recycled fibers). Among these, synthetic fibers are preferred in terms of heat resistance and abrasion resistance. Examples of these synthetic fibers include, but not limited to, thermoplastic fibers such as polyester fibers, polyamide fibers, acrylic fibers, polypropylene fibers and polyethylene fibers, as well as aramid fibers, polyarylate fibers, polybenzoxazole (PBO) fibers, polybenzthiazole fibers, polybenzimidazole (PBI) fibers, polyimide fibers, polyetherimide fibers, polyetheretherketone fibers, polyetherketone fibers, polyetherketoneketone fibers, polyamideimide fibers and other heatresistant fibers having a melting temperature or thermal degradation temperature of at least 370° C., such as flameproof fibers. Among the above thermoplastic fibers, in terms of offering superior durability and abrasion resistance, polyester fibers, polypropylene fibers and polyamide fibers are preferred.

A single type of these fibers may be used alone, or a combination of two or more types may be used.

In particular, in terms of offering ready recyclability, excellent economy, appropriate texture of the resulting non-woven fabric and excellent moldability, polyester fibers such as polyethylene terephthalate, polybutylene terephthalate and biodegradable polyester fibers are the most desirable.

Although there are no particular limitations on the fiber length and fineness of the fibers that constitute the non-woven fabric, the fiber length is preferably 10 mm or longer. Either filament or staple fibers may be used, but in the case of staple fibers, the fiber length is preferably within a range from 10 to 300 mm, and more preferably from 20 to 80 mm. Using short fibers having a fiber length of at least 10 mm reduces the likelihood of interlaced short fibers dropping out of the non-woven fabric. On the other hand, if the fiber length is too long, then the cardability tends to deteriorate, and therefore the fiber length is preferably not more than 300 mm. The fineness is preferably within a range from 0.4 to 30 denier, and more preferably from 1.0 to 10 denier. The fibers may include fibers of the same type or different types, and may include a mixture of fibers having different fineness values and fiber lengths.

The non-woven fabric weight is preferably within a range from 10 to 300 g/m$^2$. Provided the weight of the non-woven fabric satisfies this range, satisfactory sound absorption is obtained, and thermal deformation of the interior material that tends to accompany molding strain can be suppressed.

Examples of the foams include, but not limited to, various plastic foams such as polyethylene foams, polypropylene foams, polyvinyl chloride foams and polyurethane foams; and rubber-based foams such as natural rubber foams, styrene-butadiene rubber foams, chloroprene rubber foams, ethylene-propylene-butadiene rubber (EPDM) foams, and acrylonitrile-butadiene rubber foams. In terms of soundproofing, dustproofing, airtightness and moisture-proofing and the like, the expansion ratio of the foam is preferably from 15- to 40-fold, the foam thickness is preferably within a range from 1.0 to 10 mm, and the 50% compression hardness in the thickness direction is preferably from 0.01 to 1 N/cm$^2$.

Examples of the laminated structure of the adhesive sheet include single-sided adhesive sheets composed of, for example, film-like substrate or surface skin material (D)/adhesive layer/releasable film substrate, or film-like substrate or surface skin material (D)/adhesive layer/film-like substrate/adhesive layer/releasable film substrate, as well as laminates in which the releasable film substrate of one of the above single-sided adhesive sheets has been peeled off, and the exposed adhesive layer has then been bonded to an adherend, but the invention is not limited to such configurations.

Further, adhesive sheets of the structures described above may be obtained by preparing a double-sided adhesive sheet composed of releasable film substrate/adhesive layer/releasable film substrate, or releasable film substrate/adhesive layer/film-like substrate/adhesive layer/releasable film substrate, and then peeling the releasable film substrate from either one or both surfaces and bonding the exposed adhesive layer to a surface skin material (D) and/or an adherend.

There are no particular limitations on the adherend, and examples include various plastics such as polypropylene, polyethylene, acrylonitrile-butadiene-styrene resin (ABS), polycarbonate and nylon, metals such as steel, iron and aluminum, chipboard produced by compacting wood chips with a thermosetting resin, and sheets and boards made from plant-based fibers such as kenaf fiber, sisal and cardboard. These adherends may be molded into appropriate shapes as required to be used in the form of a molding, or may be used in the form of a simple flat sheet.

<Method for Producing Adhesive Sheet>

The adhesive sheet of the present invention can be produced by applying the adhesive composition using a known lamination method, and in the case where a surface skin material (D) is used as the substrate, the adhesive composition is preferably applied and/or bonded to the surface of the surface skin material (D) to form an adhesive layer using one of the production methods (i) to (iii) described below:

(i) a method in which the adhesive composition is applied to the lamination surface of at least one member among a releasable film substrate and the surface skin material (D), one member is stuck onto the other member before the adhesive composition cures, and the adhesive layer is then cured;

(ii) a method in which the adhesive composition is applied to a releasable film substrate, the adhesive composition is stuck to another releasable film substrate before the adhesive composition cures, and is then cured to form an adhesive layer, and one of the releasable film substrates is then peeled off, and the exposed adhesive layer is bonded to the surface skin material (D); and (iii) a method in which the releasable film substrate of the adhesive sheet prepared in method (i) or (ii) is peeled off, and the exposed adhesive layer is bonded to an adherend.

There are no particular limitations on the method used for applying the adhesive composition, and the adhesive composition may be applied by a conventional method using a coating device such as a Meyer bar, applicator, doctor blade, brush, spray, roller, gravure coater, die coater, lip coater, comma coater, knife coater, reverse coater or spin coater.

The thickness of the adhesive layer following drying is preferably within a range from 1 μm to 120 μm. In the case of an adhesive for a label, the thickness is preferably within a range from 1 μm to 50 μm, whereas in the case of an adhesive for an automobile, the thickness is preferably within a range from 10 μm to 90 μm.

In those cases where the adhesive composition contains a volatile liquid such as an organic solvent or water, the volatile compound can be removed by drying using a method such as heating or the like following application of the adhesive composition, thereby forming the adhesive layer. In contrast, when the adhesive composition contains no volatile liquids, the melted-state adhesive composition is applied, and the adhesive layer can then be formed by cooling and solidifying the adhesive composition.

In those cases where the applied adhesive composition is subjected to drying, there are no particular limitations on the drying method used, and examples include methods using hot air, infrared radiation or reduced pressure. The drying conditions may be altered depending on the crosslinked state of the adhesive composition, the film thickness, and the type of volatile liquid included in the adhesive composition, but a drying method using hot air of about 60 to 180° C. is usually sufficient.

Moreover, in those cases where a surface skin material (D) is used as the substrate, in any one or more of the above methods (i) to (iii) for producing an adhesive sheet, the surface skin material (D) is preferably subjected to crimping either during and/or after bonding. By performing crimping either during and/or after bonding, the constant load peeling properties can be improved.

Examples of the crimping method include compression methods using a rubber roller, a laminating roller or a press device, but in the production method (i), in terms of being able to perform the bonding and crimping simultaneously, use of a laminating roller is preferred, whereas in the production methods (ii) and (iii), in terms of not restricting the shape of the adherend, use of a press device is preferred.

The crimping temperature and crimping strength are preferably set to a temperature of 10 to 100° C. and a linear pressure of 30 to 1,500 N/cm, more preferably a temperature of 15 to 70° C. and a linear pressure of 50 to 1,000 N/cm, and even more preferably a temperature of 15 to 40° C. and a linear pressure of 100 to 500 N/cm.

Provided the crimping temperature is at least 10° C. and the crimping strength is at least 30 N/cm, the anchoring effect between the adhesive layer and the surface skin material (D) and/or the adherend is improved, and favorable constant load peeling properties can be obtained. Provided the crimping temperature is not more than 100° C. and the crimping strength is not more than 1,500 N/cm, roughening of the nap of the surface skin material (D) and deterioration in the constant load peeling properties caused by excessive penetration of the adhesive layer into the surface skin material (D) can be suppressed.

The crimping speed or crimping time in the case of a laminating roller is preferably within a range from 0.5 to 15 m/min, and more preferably from 1.0 to 5.0 m/min. In the case of a press device, a time of 3 seconds to 2 minutes is preferred, and a time of 10 seconds to 1 minute is more preferred.

By ensuring that the crimping speed or crimping time satisfies the above range, the anchoring effect between the adhesive layer and the surface skin material (D) and/or adherend can be improved, and favorable constant load peeling properties can be achieved.

EXAMPLES

Specific examples of the present invention and comparative examples are described below, but the present invention is in no way limited by the following examples. In the following examples and comparative examples, the units "parts" and "%" represent "parts by mass" and "% by mass" respectively.

<Measurement of Non-Volatile Fraction>

About 1 g of the sample solution was weighed into a metal container, the solution was dried in a 150° C. oven for 20 minutes, the residue was weighed, and the residual percentage was calculated as the non-volatile fraction (non-volatile fraction concentration).

<Measurement of Weight-Average Molecular Weight (Mw)>

The weight-average molecular weight (Mw) was measured by gel permeation chromatography (GPC). A GPC "HPC-8020" device manufactured by Tosoh Corporation was used as the measuring apparatus. For the column, a Super HM-M column and a Super HM-L column, both manufactured by Tosoh Corporation, were connected in series. Tetrahydrofuran (THF) was used as the solvent (eluent), and the measurement was performed at 40° C. All weight-average molecular weight (Mw) values were calculated relative to standard polystyrenes.

<Measurement of Glass Transition Temperature (Tg)>

The glass transition temperature (Tg) was determined by measurement using a differential scanning calorimeter (DSC). For the measurement, an "SSC5200 Disk Station" (manufactured by Seiko Instruments Inc.) was connected to a Robot DSC (a differential scanning calorimeter "RDC220" manufactured by Seiko Instruments Inc.). The acrylic polymer solution obtained in each synthesis example was coated onto a polyester releasable film substrate and dried, and the dried product was used as a measurement sample. Ten mg of the measurement sample was set in the differential scanning calorimeter, and after holding the temperature at 100° C. for 5 minutes, liquid nitrogen was used to cool the sample to −120° C. Subsequently, the temperature was raised at a rate of 10° C./minute, and DSC measurements were performed until the temperature reached 200° C. The glass transition temperature (Tg) (units: ° C.) was determined from the obtained DSC chart.

<Measurement of Acid Value (AV)>

A 1 g sample was weighed accurately into a stoppered conical flask, 100 ml of a mixed solution of toluene/ethanol (volume ratio: toluene/ethanol=2/1) was added to dissolve the sample, and a titration of the resulting solution was performed using a 0.1 N alcoholic potassium hydroxide solution. The acid value (units: mgKOH/g) was determined using the formula below. The acid value represents a numerical value for the dried sample.

Acid value=$\{(5.61 \times a \times F)/S\}$/(non-volatile fraction concentration/100)

S: weighed mass of sample (g)
a: volume consumed of 0.1 N alcoholic potassium hydroxide solution (ml)
F: 0.1 N alcoholic potassium hydroxide solution factor <Measurement of Hydroxyl Value (OHV)>

A 1 g sample was weighed accurately into a stoppered conical flask, and 100 ml of pyridine was added to dissolve the sample. Subsequently, 5 ml of an acetylation agent (a solution prepared by dissolving 25 g of acetic anhydride in pyridine and making the volume up to 100 ml) was added accurately, and after stirring for one hour, a titration was performed using a 0.5 N alcoholic potassium hydroxide solution. The hydroxyl value (units: mgKOH/g) was determined using the formula below. The hydroxyl value represents a numerical value for the dried sample.

Hydroxyl value=$[\{(b-a) \times F \times 28.05\}/S]$/(non-volatile fraction concentration/100)+$D$ S: weighed mass of sample (g)
a: volume consumed of 0.5 N alcoholic potassium hydroxide solution (ml)
b: volume consumed of 0.5 N alcoholic potassium hydroxide solution in blank test (ml)
F: 0.5 N alcoholic potassium hydroxide solution factor
D: acid value (mgKOH/g)

<Measurement of Isocyanate Value (NCO Value)>

A 10 g sample was weighed accurately into a stoppered conical flask, and 25 ml of o-dichlorobenzene and 10 ml of a mixed solution of di-n-butylamine/o-dichlorobenzene (mass ratio: di-n-butylamine/o-dichlorobenzene=1/24.8) were added to dissolve the sample. Subsequently, 80 g of methanol and bromophenol blue reagent as an indicator were added to the solution, and a titration was performed using a 0.1 N alcoholic hydrochloric acid solution. The end point was deemed to be the point where the solution developed a yellow-green color that was retained for at least 30 seconds. The NCO value (units: %) was determined using the formula below.

NCO value=$[0.42 \times (B-C) \times F]/W$

W: weighed mass of sample (g)

B: volume consumed of 0.1 N alcoholic hydrochloric acid solution during sample titration (ml)

C: volume consumed of 0.1 N alcoholic hydrochloric acid solution during blank test titration (ml)

F: 0.1 N alcoholic hydrochloric acid solution factor

<Calculation of Linear Pressure During Crimping>

The linear pressure (N/cm) was calculated using the formula below.

$$\text{Linear pressure (N/cm)} = ((A \times B \times C) + (D \times D \times 3.14 \times E \times F \div 1{,}000{,}000 \times 9.8)) \div G$$

A: cross-sectional area of pressurizing cylinder (mm$^2$)

B: number of pressurizing cylinders

C: load (MPa)

D: roller radius (mm)

E: roller width (mm)

F: roller density (g/cm$^3$)

G: test piece size (cm)

The materials used in the examples and comparative examples and the abbreviations for those materials are listed below.

<Monomers Having Ethylenic Unsaturated Bond> nBA: n-butyl acrylate

2EHA: 2-ethylhexyl acrylate

MMA: methyl methacrylate

Vac: vinyl acetate

2HEA: 2-hydroxyethyl acrylate

AA: acrylic acid

IBXA: isobornyl acrylate

<Chain Transfer Agents>

1-methyl-4-isopropylidene-1-cyclohexene 2-ethylhexyl thioglycolate

<Polymerization Initiators> tert-butyl-2-ethylperoxyhexanoate (product name: Perbutyl O, manufactured by NOF Corporation)

Benzoyl peroxide (product name: Nyper BW, manufactured by NOF Corporation) 2,2'-azobis(isobutyronitrile) (product name: V-60, manufactured by Wako Pure Chemical Industries, Ltd.)

<Isocyanate Compounds (B)>

XDI-TMP: a m-xylylene diisocyanate trimethylolpropane adduct, number of isocyanate groups=3, NCO value=7.7%, non-volatile fraction=50%

TDI-TMP: a tolylene diisocyanate trimethylolpropane adduct, number of isocyanate groups=3, NCO value=6.5%, non-volatile fraction=37.5%

<Compound (C) Having a Steroid Skeleton>

Phytosterol: (product name: Phytosterol CO, manufactured by Tama Biochemical Co., Ltd.)

<Silane coupling agents (E)>

KBE-403: γ-glycidoxypropyltriethoxysilane (product name: KBE-403, manufactured by Shin-Etsu Chemical Co., Ltd.)

KBM-9659: tris(trimethoxysilylpropyl) isocyanurate (product name: KBM-9659, manufactured by Shin-Etsu Chemical Co., Ltd.)

<Tackifiers>

S-100: a disproportionated rosin ester (product name: Super Ester S-100, manufactured by Arakawa Chemical Industries, Ltd., hydroxyl value: 5.0)

YS POLYSTAR T100: a terpene phenol resin (product name: YS POLYSTAR T100, manufactured by Yasuhara Chemical Co., Ltd.)

KE-359: a hydrogenated rosin ester (product name: PINECRYSTAL KE-359, manufactured by Arakawa Chemical Industries, Ltd., hydroxyl value: 43.9)

D-125: a polymerized rosin ester (product name: Pensel D-125, manufactured by Arakawa Chemical Industries, Ltd., hydroxyl value: 32.5)

<Surface Skin Materials (D)>

Three-Layer Leather:

Surface layer: vinyl chloride leather, thickness: 0.7 mm, surface hardness (Shore A hardness): 50 mm Middle layer: polyurethane foam, thickness: 3.0 mm, foam expansion ratio: 30-fold Rear surface layer: polyester nonwoven fabric, fabric weight: 53 g/m$^2$ Single-Layer Fabric A:

Upper and lower surfaces: polyester jersey, thickness: 1.2 mm, a jersey prepared using a circular knitting machine, using a 150 denier polyester shrunk yarn as the upper thread, a 150-denier polyester shrunk yarn as the linking thread, and a 150-denier polyester shrunk yarn as the under thread, under conditions including (length of linking thread)÷(length of under thread) (A/B) of 1.2, and using a heat setting on dyeing to achieve a vertical density of 36 course/inch and a lateral density of 30 well/inch.

Single-Layer Fabric B:

Upper and lower surfaces: polyester jersey, thickness: 1.2 mm, a jersey prepared using a circular knitting machine, using a 300 denier polyester shrunk yarn as the upper thread, a 200-denier polyester shrunk yarn as the linking thread, and a 150-denier polyester shrunk yarn as the under thread, under conditions including (length of linking thread)÷(length of under thread) (A/B) of 1.3, and using a heat setting on dyeing to achieve a vertical density of 30 course/inch and a lateral density of 24 well/inch.

Urethane Foam:

Upper and lower surfaces: polyurethane foam (product name: ECS, manufactured by INOAC Corporation)

EPDM Foam:

Upper and lower surfaces: EPDM foam, density: 100 kg/m$^3$, tensile strength: 70 kPa (JIS K6301), elongation: 250% (JIS K6301), 70% compressive residual strain: 22.1%, 50% compression hardness in the thickness direction: 0.2 N/cm$^2$, thickness: 10 mm <Synthesis of Acrylic Polymers (A)>

Synthesis Example 1

A polymerization reaction apparatus was prepared containing a reaction chamber, a stirrer, a thermometer, a reflux condenser, a dropping funnel and a nitrogen inlet tube. The reaction chamber and the dropping funnel were each charged with a monomer mixture containing the monomers, solvents and polymerization initiators shown below, in the ratios shown below, and following flushing of the air inside the reaction chamber with nitrogen gas, the contents of the reaction chamber were heated to 80° C. with constant stirring and under a nitrogen atmosphere. Subsequently, the monomer mixture in the dropping funnel was added dropwise to the reaction chamber over a period of one hour. Following completion of the dropwise addition, the reaction was continued for a further three hours under constant stirring. An additional amount of the polymerization initiator was then added in a subsequent addition, and the reaction was continued for a further three hours. Following completion of the reaction, the diluting solvent listed below was added, and the solution was cooled to room temperature to obtain a solution containing an acrylic polymer (A). The weight-average molecular weight (Mw) of the obtained acrylic polymer was 470,000, the glass transition temperature was −33° C., and the non-volatile fraction was 50%.
[Reaction Chamber]
<Monomers Having Ethylenic Unsaturated Bond>
((Meth)Acrylate Ester Monomers)
  nBA 38.0 parts
  MMA 5.0 parts
(Monomer Having Hydroxyl Group and Ethylenic Unsaturated Bond)
  2HEA 0.35 parts
(Other Monomer Having Ethylenic Unsaturated Bond)
  Vac 4.0 parts
<Solvents>
  Ethyl acetate 33.8 parts
  Toluene 0.9 parts
<Polymerization Initiator>
  tert-butyl-2-ethylperoxyhexanoate 0.071 parts
[Dropping Funnel]
<Monomers Having Ethylenic Unsaturated Bond>
(Acrylate Ester Monomer)
  nBA 52.1 parts
(Monomer Having Hydroxyl Group and Ethylenic Unsaturated Bond)
  2HEA 0.35 parts
<Solvents>
  Ethyl acetate 39.7 parts
  Toluene 1.1 parts
<Polymerization Initiator>
  tert-butyl-2-ethylperoxyhexanoate 0.071 parts
[Subsequent Addition]
<Polymerization Initiator>
  tert-butyl-2-ethylperoxyhexanoate 0.12 parts
[Diluting Solvents]
  Ethyl acetate 21.5 parts
  Toluene 2.9 parts Synthesis Example 2

With the exception of altering the types and blend amounts of the monomers, the solvents and the polymerization initiator in the manner described below, a solution containing an acrylic polymer (A) was obtained using the same method as Synthesis Example 1. The weight-average molecular weight (Mw) of the obtained acrylic polymer was 470,000, the glass transition temperature was −33° C., and the non-volatile fraction was 50%.
[Reaction Chamber]
<Monomers Having Ethylenic Unsaturated Bond>
((Meth)Acrylate Ester Monomers)
  nBA 38.1 parts
  MMA 5.0 parts
(Monomer Having Carboxyl Group and Ethylenic Unsaturated Bond)
  AA 0.44 parts
(Other Monomer Having Ethylenic Unsaturated Bond)
  Vac 4.0 parts
<Solvents>
  Ethyl acetate 34.0 parts
  Toluene 0.9 parts
<Polymerization Initiator>
  tert-butyl-2-ethylperoxyhexanoate 0.071 parts
[Dropping Funnel]
<Monomer Having Ethylenic Unsaturated Bond>
(Acrylate Ester Monomer)
  nBA 52.2 parts
<Solvents>
  Ethyl acetate 39.6 parts
  Toluene 1.1 parts
<Polymerization Initiator>
  tert-butyl-2-ethylperoxyhexanoate 0.071 parts
[Subsequent Addition]
<Polymerization Initiator>
  tert-butyl-2-ethylperoxyhexanoate 0.12 parts
[Diluting Solvents]
  Ethyl acetate 21.5 parts
  Toluene 2.9 parts Synthesis Example 3

With the exception of altering the types and blend amounts of the monomers, the solvent and the polymerization initiators in the manner described below, a solution containing an acrylic polymer (A) was obtained using the same method as Synthesis Example 1. The weight-average molecular weight (Mw) of the obtained acrylic polymer was 520,000, the glass transition temperature was −43° C., and the non-volatile fraction was 45%.
[Reaction Chamber]
<Monomers Having Ethylenic Unsaturated Bond>
((Meth)Acrylate Ester Monomers)
  nBA 25.5 parts
  2EHA 6.6 parts
(Monomer Having Hydroxyl Group and Ethylenic Unsaturated Bond)
  2HEA 0.03 parts
(Monomer Having Carboxyl Group and Ethylenic Unsaturated Bond)
  AA 1.0 parts
<Solvent>
  Ethyl acetate 37.3 parts
<Chain Transfer Agent>
  1-methyl-4-isopropylidene-1-cyclohexene 0.025 parts
<Polymerization Initiator>
  Benzoyl peroxide 0.088 parts
[Dropping Funnel]
<Monomers Having Ethylenic Unsaturated Bond>
(Acrylate Ester Monomers)
  nBA 51.0 parts
  2EHA 13.3 parts
(Monomer Having Hydroxyl Group and Ethylenic Unsaturated Bond)
  2HEA 0.07 parts
(Monomer Having Carboxyl Group and Ethylenic Unsaturated Bond)
  AA 2.0 parts
<Solvent>
  Ethyl acetate 44.4 parts
<Chain Transfer Agent>
  1-methyl-4-isopropylidene-1-cyclohexene 0.025 parts
<Polymerization Initiator>
  Benzoyl peroxide 0.177 parts
[Subsequent Addition]
<Polymerization Initiators>
  Benzoyl peroxide 0.068 parts
  tert-butyl-2-ethylperoxyhexanoate 0.102 parts
[Diluting Solvent]
  Ethyl acetate 40.5 parts Synthesis Example 4

With the exception of altering the types and blend amounts of the monomers, the solvent and the polymerization initiators in the manner described below, a solution containing an acrylic polymer (A) was obtained using the same method as Synthesis Example 1. The weight-average molecular weight (Mw) of the obtained acrylic polymer was 520,000, the glass transition temperature was −43° C., and the non-volatile fraction was 45%.
[Reaction Chamber]
<Monomers Having Ethylenic Unsaturated Bond>
((Meth)Acrylate Ester Monomers)
  nBA 25.5 parts
  2EHA 6.7 parts
(Monomer Having Carboxyl Group and Ethylenic Unsaturated Bond)
  AA 1.0 parts
<Solvent>
  Ethyl acetate 37.3 parts
<Chain Transfer Agent>
  1-methyl-4-isopropylidene-1-cyclohexene 0.025 parts
<Polymerization Initiator>
  Benzoyl peroxide 0.088 parts
[Dropping Funnel]
<Monomers Having Ethylenic Unsaturated Bond>
(Acrylate Ester Monomers)
  nBA 51.0 parts
  2EHA 13.3 parts
(Monomer Having Carboxyl Group and Ethylenic Unsaturated Bond)
  AA 2.0 parts
<Solvent>
  Ethyl acetate 44.4 parts
<Chain Transfer Agent>
  1-methyl-4-isopropylidene-1-cyclohexene 0.025 parts
<Polymerization Initiator>
  Benzoyl peroxide 0.177 parts
[Subsequent Addition]
<Polymerization Initiators>
  Benzoyl peroxide 0.068 parts
  tert-butyl-2-ethylperoxyhexanoate 0.102 parts
[Diluting Solvent]
  Ethyl acetate 40.5 parts
<Synthesis of Tackifier>

Synthesis Example 5

A polymerization reaction apparatus was prepared containing a reaction chamber, a stirrer, a thermometer, a reflux condenser and a nitrogen inlet tube. The reaction chamber was charged with a monomer mixture containing the monomer, solvent, chain transfer agent and polymerization initiator shown below, in the ratio shown below, and following flushing of the air inside the reaction chamber with nitrogen gas, the contents of the reaction chamber were heated to 80° C. with constant stirring and under a nitrogen atmosphere, and the reaction was continued for three hours under constant stirring. An additional amount of the polymerization initiator was then added in a subsequent addition, and the reaction was continued for a further four hours. Following completion of the reaction, the diluting solvent listed below was added, and the solution was cooled to room temperature to obtain a solution containing a tackifier. The weight-average molecular weight (Mw) of the obtained tackifier was 3,300, the glass transition temperature was 60° C., and the non-volatile fraction was 70%.
[Reaction Chamber]
<Monomer Having Ethylenic Unsaturated Bond>
((Meth)Acrylate Ester Monomers)
  IBXA 100 parts
<Solvent>
  Ethyl acetate 27.7 parts
<Chain Transfer Agent>
  2-ethylhexyl thioglycolate 10.8 parts
<Polymerization Initiator>
  2,2'-azobis(isobutyronitrile) 0.12 parts
[Subsequent Addition]
<Polymerization Initiator>
  2,2'-azobis(isobutyronitrile) 0.04 parts
[Diluting Solvent]
  Ethyl acetate 10.6 parts Embodiment 1 (Adhesive for Label)

Example 1-1

<Production of Adhesive Composition>
One hundred parts of the acrylic polymer (A) obtained in Synthesis Example 1 was blended uniformly with 1.0 parts of XDI-TMP as the polyfunctional isocyanate compound (B), 2.0 parts of cholesterol as the compound (C) having a steroid skeleton, and 20 parts of S-100 as a tackifier to form an adhesive composition, with each of the above amounts representing a non-volatile fraction equivalent amount.
<Production of Adhesive Sheet>
The obtained adhesive composition was applied to the release-treated surface of a polyethylene terephthalate releasable film substrate having a thickness of 38 μm (product name: SP-PET382050, manufactured by Lintec Corporation, hereafter simply referred to as the "releasable film substrate") using a comma coater at a speed of 2 m/minute so as to achieve a coating with a thickness following drying of 25 μm, and the applied coating was then dried at 100° C. for two minutes to form an adhesive layer. The surface of this adhesive layer and a polyester film having a thickness of 50 μm (product name: E5100, manufactured by Toyobo Co., Ltd.) were then stuck together to form an adhesive sheet. The thus obtained adhesive sheet was aged for one week in an environment having a temperature of 23° C. and a relative humidity of 50% to obtain an adhesive sheet.

Examples 1-2 to 1-14

With the exception of altering the acrylic polymer (A), the polyfunctional isocyanate compound (B), the compound (C) having a steroid skeleton and the tackifier as shown in Table 1, adhesive compositions and adhesive sheets were obtained using the same methods as those described for Example 1-1.

Comparative Examples 1-1 to 1-7

With the exception of altering the acrylic polymer (A), the polyfunctional isocyanate compound (B), the compound (C) having a steroid skeleton and the tackifier as shown in Table 2, adhesive compositions and adhesive sheets were obtained using the same methods as those described for Example 1-1.
<Evaluations>
The adhesive compositions and adhesive sheets obtained in the above examples and comparative examples were each evaluated using the methods described below. The results are shown in Tables 1 and 2.
(PP Adhesive Force)
The adhesive force was measured in accordance with JIS Z 0237. The obtained adhesive sheet was cut to a width of 25 mm, the releasable film substrate was removed, the exposed adhesive layer was stuck to a polypropylene sheet (product name: Kobe Polysheet PP, manufactured by Yamaso Co., Ltd.) in an atmosphere having a temperature of 23° C. and a relative humidity of 50%, and after crimping by rolling a 2 kg roller once back and forth across the sheet, the sheet was left to stand in the same environment for 24 hours, and a tensile tester (product name: Tensilon, manufactured by Orientec Co., Ltd.) was then used to measure the peel strength when the adhesive sheet was peeled at a pull speed of 300 mm/minute in a direction at an angle of 180° C. in the same environment.

Peel strength exceeding 14 N/25 mm: excellent for practical application

Peel strength of 10 to 14 N/25 mm: suitable for practical application

Peel strength less than 10 N/25 mm: unsuitable for practical application (PP Curved Surface Adhesiveness)

The obtained adhesive sheet was cut to form a test piece having dimensions of 25 mm×25 mm, the releasable film substrate was removed, and the exposed adhesive layer was stuck to a rod of polypropylene (product name: Kobe Polysheet PP, manufactured by Yamaso Co., Ltd.) having a diameter of 10 mm in an atmosphere having a temperature of 23° C. and a relative humidity of 50%, and the adhesive sheet was crimped. Lifting or peeling of the edges of the test piece were then measured, after standing for three days in the same environment, and after standing for one day in an environment at 80° C., and the curved surface adhesiveness was evaluated against the following three levels.

A: no lifting or peeling of test piece, or lifting of less than 1 mm, excellent for practical application B: lifting of 1 to 3 mm, suitable for practical application C: lifting exceeding 3 mm, or total peeling, unsuitable for practical application (Coating Film External Appearance)

The external appearance of the adhesive sheet was inspected visually, and evaluated against the following three evaluation levels.

A: colorless and transparent, excellent for practical application

B: slightly colored, but transparent, suitable for practical application

C: cloudy or multiple aggregates visible, unsuitable for practical application (Holding Power)

The holding power was measured in accordance with JIS Z 0237. The obtained adhesive sheet was cut to a width of 25 mm and a length of 100 mm, the releasable film substrate was removed, and a portion of the adhesive sheet having a bonding surface area of 25 mm×25 mm was stuck to one end of a polished stainless steel plate (SUS304) having a portion with a length of 25 mm and a width of 25 mm that had been polished with a sandpaper (#280), thus forming a test piece. The stainless steel plate of the test piece was suspended vertically inside a 40° C. thermostatic chamber, and a 1 kg weight was suspended from the unbonded end of the adhesive sheet and left to hang for 72,000 seconds. In those cases where the sheet fell within 72,000 seconds, the time taken for the weight to fall was measured, whereas in those cases where the sheet held, the length of the displacement of the adhesive sheet from the initial bonding position was measured, and the holding power was evaluated against the following three levels.

A: the sheet held with no displacement, excellent for practical application

B: the sheet held with displacement of not more than 1 mm, suitable for practical application C: the sheet held with displacement exceeding 1 mm, or the sheet fell, unsuitable for practical application

TABLE 1

| <<Embodiment 1 (adhesive for label)>> | | | | | | | | | | |
|---|---|---|---|---|---|---|---|---|---|---|
| | | | Hydroxyl group(s) | | | | | | | |
| Name | | Molecular weight | Type | Number of hydroxyl groups | Example 1-1 | Example 1-2 | Example 1-3 | Example 1-4 | Example 1-5 | Example 1-6 | Example 1-7 |
| Compound (C) having a steroid skeleton (parts) | Cholesterol | 386.7 | secondary | one | 2.0 | 6.0 | 15 | | | | |
| | Dehydroepiandrosterone | 288.4 | secondary | one | | | | 2.0 | | | |
| | Desoxycorticosterone | 330.5 | primary | one | | | | | 2.0 | | |
| | Cholesterol acetate | 428.7 | none | none | | | | | | 2.0 | |
| | Bolandiol | 276.4 | secondary | two | | | | | | | 2.0 |
| | Solanine | 868.1 | primary, secondary | six | | | | | | | |
| Acrylic polymer (A) (parts) | | | Synthesis Example 1 | | 100 | 100 | 100 | 100 | 100 | 100 | 100 |
| | | | Synthesis Example 2 | | | | | | | | |
| | | | Synthesis Example 3 | | | | | | | | |
| | | | Synthesis Example 4 | | | | | | | | |
| Polyfunctional isocyanate compound (B) (parts) | | | XDI-TMP | | 1.0 | 1.9 | 3.9 | 1.2 | 1.1 | 0.6 | 1.8 |
| | | | TDI-TMP | | | | | | | | |
| Tackifier (parts) | | | S-100 | | 20 | 20 | 20 | 20 | 20 | 20 | 20 |
| | | | YS POLYSTAR T100 | | | | | | | | |
| | | | Synthesis Example 5 | | | | | | | | |
| Isocyanate groups in polyfunctional isocyanate compound (B)/ (hydroxyl groups and/or carboxyl groups in acrylic polymer (A) + hydroxyl groups in compound (C) having a steroid skeleton) | | | | | 0.3 | 0.3 | 0.3 | 0.3 | 0.3 | 0.3 | 0.3 |
| PP adhesive force (300 mm/min) | | | (N/25 mm) | | 18 | 16 | 12 | 15 | 15 | 18 | 15 |
| PP curved surface adhesiveness | | | 23° C.-3 days | | A | A | A | A | A | B | A |
| | | | 80° C.-1 day | | A | A | B | A | B | B | A |
| Coating film external appearance | | | | | A | A | B | A | A | A | B |
| Holding power | | | | | A | A | A | A | B | A | A |

TABLE 1-continued

<<Embodiment 1 (adhesive for label)>>

| | Name | Molecular weight | Hydroxyl group(s) Type | Number of hydroxyl groups | Example 1-8 | Example 1-9 | Example 1-10 | Example 1-11 | Example 1-12 | Example 1-13 | Example 1-14 |
|---|---|---|---|---|---|---|---|---|---|---|---|
| Compound (C) having a steroid skeleton (parts) | Cholesterol | 386.7 | secondary | one | | 2.0 | 2.0 | 2.0 | 2.0 | 2.0 | 2.0 |
| | Dehydroepiandrosterone | 288.4 | secondary | one | | | | | | | |
| | Desoxycorticosterone | 330.5 | primary | one | | | | | | | |
| | Cholesterol acetate | 428.7 | none | none | | | | | | | |
| | Bolandiol | 276.4 | secondary | two | | | | | | | |
| | Solanine | 868.1 | primary, secondary | six | 2.0 | | | | | | |
| Acrylic polymer (A) (parts) | | | Synthesis Example 1 | | 100 | 100 | 100 | 100 | | | |
| | | | Synthesis Example 2 | | | | | | 100 | | |
| | | | Synthesis Example 3 | | | | | | | 100 | |
| | | | Synthesis Example 4 | | | | | | | | 100 |
| Polyfunctional isocyanate compound (B) (parts) | | | XDI-TMP | | 2.4 | 1.0 | 1.0 | | 1.0 | 1.5 | 1.5 |
| | | | TDI-TMP | | | | | 0.9 | | | |
| Tackifier (parts) | | | S-100 | | 20 | | | 20 | 20 | 20 | 20 |
| | | | YS POLYSTAR T100 | | | 20 | | | | | |
| | | | Synthesis Example 5 | | | | 20 | | | | |
| Isocyanate groups in polyfunctional isocyanate compound (B)/ (hydroxyl groups and/or carboxyl groups in acrylic polymer (A) + hydroxyl groups in compound (C) having a steroid skeleton) | | | | | 0.3 | 0.3 | 0.3 | 0.3 | 0.3 | 0.1 | 0.1 |
| PP adhesive force (300 mm/min) | | | (N/25 mm) | | 11 | 14 | 17 | 16 | 12 | 17 | 13 |
| PP curved surface adhesiveness | | | 23° C.-3 days | | A | A | A | A | A | A | A |
| | | | 80° C.-1 day | | B | A | A | A | B | A | B |
| Coating film external appearance | | | | | B | A | A | A | A | A | A |
| Holding power | | | | | A | A | A | A | B | A | B |

TABLE 2

<<Embodiment 1 (adhesive for label)>>

| | Name | Molecular weight | Hydroxyl group(s) Type | Number of hydroxyl groups | Comparative Example 1-1 | Comparative Example 1-2 | Comparative Example 1-3 | Comparative Example 1-4 | Comparative Example 1-5 | Comparative Example 1-6 | Comparative Example 1-7 |
|---|---|---|---|---|---|---|---|---|---|---|---|
| Compound (C) having a steroid skeleton (parts) | Cholesterol | 386.7 | secondary | one | | | | 22 | 22 | | 22 |
| | Dehydroepiandrosterone | 288.4 | secondary | one | | | | | | | |
| | Desoxycorticosterone | 330.5 | primary | one | | | | | | | |
| | Cholesterol acetate | 428.7 | none | none | | | | | | | |
| | Bolandiol | 276.4 | secondary | two | | | | | | | |
| | Solanine | 868.1 | primary, secondary | six | | | | | | | |
| Acrylic polymer (A) (parts) | | | Synthesis Example 1 | | 100 | 100 | 100 | 100 | 100 | | |
| | | | Synthesis Example 2 | | | | | | | 100 | 100 |
| | | | Synthesis Example 3 | | | | | | | | |
| | | | Synthesis Example 4 | | | | | | | | |
| Polyfunctional isocyanate compound (B) (parts) | | | XDI-TMP | | 0.6 | 0.6 | 0.6 | 1.0 | 5.6 | 0.6 | 5.6 |
| | | | TDI-TMP | | | | | | | | |
| Tackifier (parts) | | | S-100 | | 20 | | | 20 | 20 | 20 | 20 |
| | | | YS POLYSTAR T100 | | | 20 | | | | | |
| | | | Synthesis Example 5 | | | | 20 | | | | |
| Isocyanate groups in polyfunctional isocyanate compound (B)/ (hydroxyl groups and/or carboxyl groups in acrylic polymer (A) + hydroxyl groups in compound (C) having a steroid skeleton) | | | | | 0.3 | 0.3 | 0.3 | 0.1 | 0.3 | 0.3 | 0.3 |
| PP adhesive force (300 mm/min) | | | (N/25 mm) | | 18 | 14 | 17 | 20 | 4 | 15 | 7 |
| PP curved surface adhesiveness | | | 23° C.-3 days | | B | C | C | A | A | C | B |
| | | | 80° C.-1 day | | C | C | C | C | C | C | C |
| Coating film external appearance | | | | | A | A | A | C | C | A | C |
| Holding power | | | | | A | A | A | C | A | C | B |

Embodiment 2 (Adhesive for Automobile)

Example 2-1

<Production of Adhesive Composition>
One hundred parts of the acrylic polymer (A) obtained in Synthesis Example 3 was blended uniformly with 7.3 parts of TDI-TMP as the polyfunctional isocyanate compound (B), 3.0 parts of cholesterol as the compound (C) having a steroid skeleton, and 10 parts of KE-359 and 15 parts of D-125 as tackifiers to form an adhesive composition, with each of the above amounts representing a non-volatile fraction equivalent amount.
<Production of Adhesive Sheet>
The obtained adhesive composition was applied to the release-treated surface of a polyethylene terephthalate releasable film substrate having a thickness of 38 µm (product name: SP-PET382050, manufactured by Lintec Corporation) using a comma coater at a speed of 2 m/minute so as to achieve a coating with a thickness following drying of 65 µm, and the applied coating was then dried at 100° C. for two minutes to form an adhesive layer. The surface of this adhesive layer and a polyester film having a thickness of 50 µm (product name: E5100, manufactured by Toyobo Co., Ltd.) were then stuck together to form an adhesive sheet. The thus obtained adhesive sheet was aged for one week in an environment having a temperature of 23° C. and a relative humidity of 50% to obtain an adhesive sheet.

Examples 2-2 to 2-18

With the exception of altering the acrylic polymer (A), the polyfunctional isocyanate compound (B), the compound (C) having a steroid skeleton and the silane coupling agent (E) as shown in Table 3, adhesive compositions and adhesive sheets were obtained using the same methods as those described for Example 2-1.

Comparative Examples 2-1 to 2-6

With the exception of altering the acrylic polymer (A), the polyfunctional isocyanate compound (B) and the compound (C) having a steroid skeleton as shown in Table 4, adhesive compositions and adhesive sheets were obtained using the same methods as those described for Example 2-1.
<Evaluations>
The adhesive compositions and adhesive sheets obtained in the above examples and comparative examples were each evaluated using the methods described below. The results are shown in Tables 3 and 4.
(PP Adhesive Force)
The adhesive force was measured in accordance with JIS Z 0237. The obtained adhesive sheet was cut to a width of 25 mm, the releasable film substrate was removed, the exposed adhesive layer was stuck to a polypropylene sheet (product name: Kobe Polysheet PP, manufactured by Yamaso Co., Ltd.) in an atmosphere having a temperature of 23° C. and a relative humidity of 50%, and after crimping by rolling a 2 kg roller once back and forth across the sheet, the sheet was left to stand in the same environment for 24 hours, and a tensile tester (product name: Tensilon, manufactured by Orientec Co., Ltd.) was then used to measure the peel strength when the adhesive sheet was peeled at a pull speed of 200 mm/minute in a direction at an angle of 180° C. in the same environment.

Peel strength exceeding 13 N/25 mm: excellent for practical application

Peel strength of 8 to 13 N/25 mm: suitable for practical application

Peel strength less than 8 N/25 mm: unsuitable for practical application
(Constant load peeling properties)
The configuration used for testing the constant load peeling properties is described with reference to FIG. 1, wherein in FIG. 1:

A is the starting point of end portion of adhesive sheet bonded to adherend immediately following sticking to adherend, B is the starting point of end portion of adhesive sheet bonded to adherend following constant load peeling properties test, C is the end point of end portion of adhesive sheet bonded to adherend, a length between A and B is the length of adhesive sheet that has peeled from adherend, and a length between A and C is the length of adhesive sheet stuck to adherend immediately following sticking to adherend.

An 80 mm-long portion of an adhesive sheet (2) that had been cut to a length of 100 mm and a width of 25 mm was stuck to a propylene sheet (product name: Kobe Polysheet PP, manufactured by Yamaso Co., Ltd.) that functioned as an adherend (1) in an atmosphere at 23° C. (and a relative humidity of 50%), crimping was performed by rolling a 2 kg roller twice back and forth over the bonded portion, and the resulting structure was left to stand for 24 hours in an atmosphere at 23° C. (and a relative humidity of 50%). Subsequently, in an atmosphere at 80° C., a 200 g weight (3) was attached to the non-bonded portion of the adhesive sheet (2), thereby applying a load in a direction perpendicular to the surface of the adherend (1), and after 24 hours had elapsed, the length of the adhesive sheet that had peeled from the adherend was measured. In those cases where the adhesive sheet had peeled completely off and fallen, the time taken for the sheet to fall was measured. In FIG. 1, the distance between A and B represents the peeled length. Adhesive sheets that do not fall are preferable to those that fall. Among adhesive sheets that do not fall, those having a shorter peeled length are more favorable. Further, among adhesive sheets that fall, those which require a longer time for the sheet to fall are preferable.

TABLE 3

<<Embodiment 2 (adhesive for automobile)>>

| | Name | Molecular weight | Hydroxyl group(s) Type | Number of hydroxyl groups | Example 2-1 | Example 2-2 | Example 2-3 | Example 2-4 | Example 2-5 | Example 2-6 | Example 2-7 | Example 2-8 | Example 2-9 |
|---|---|---|---|---|---|---|---|---|---|---|---|---|---|
| Compound (C) having a steroid skeleton (parts) | Cholesterol | 386.7 | secondary | one | 3.0 | 5.0 | 10 | 15 | | | | | |
| | Dehydroepian-drosterone | 288.4 | secondary | one | | | | | 5.0 | | | | |
| | Desoxy-corticosterone | 330.5 | primary | one | | | | | | 5.0 | | | |

TABLE 3-continued

<<Embodiment 2 (adhesive for automobile)>>

|  | Name | Molecular weight | Type | Number of hydroxyl groups | | | | | | | | | |
|---|---|---|---|---|---|---|---|---|---|---|---|---|---|
|  | Cholesterol acetate | 428.7 | none | none |  |  |  |  |  |  |  | 5.0 |  |
|  | Bolandiol | 276.4 | secondary | two |  |  |  |  |  |  |  |  | 5.0 |
|  | Solanine | 868.1 | primary, secondary | six |  |  |  |  |  |  |  |  |  | 5.0 |
| Acrylic polymer (A) (parts) | Synthesis Example 1 |  |  |  |  |  |  |  |  |  |  |  |
|  | Synthesis Example 2 |  |  |  |  |  |  |  |  |  |  |  |
|  | Synthesis Example 3 |  |  |  | 100 | 100 | 100 | 100 | 100 | 100 | 100 | 100 | 100 |
|  | Synthesis Example 4 |  |  |  |  |  |  |  |  |  |  |  |
| Polyfunctional isocyanate compound (B) (parts) | TDI-TMP |  |  |  | 7.3 | 8.8 | 12.6 | 16.3 | 10.1 | 9.5 | 5.1 | 15.6 | 20.1 |
|  | XDI-TMP |  |  |  |  |  |  |  |  |  |  |  |
| Silane coupling agent (E) (parts) | KBM-403 |  |  |  |  |  |  |  |  |  |  |  |
|  | KBM-9659 |  |  |  |  |  |  |  |  |  |  |  |
| Tackifier (parts) | KE-359 |  |  |  | 10 | 10 | 10 | 10 | 10 | 10 | 10 | 10 | 10 |
|  | D-125 |  |  |  | 15 | 15 | 15 | 15 | 15 | 15 | 15 | 15 | 15 |
| Isocyanate groups in polyfunctional isocyanate compound (B)/(hydroxyl groups in acrylic polymer (A) + hydroxyl groups in compound (C) having a steroid skeleton + hydroxyl groups in tackifier) |  |  |  |  | 1.2 | 1.2 | 1.2 | 1.2 | 1.2 | 1.2 | 1.2 | 1.2 | 1.2 |
| Isocyanate groups in polyfunctional isocyanate compound (B)/(hydroxyl groups and/or carboxyl groups in acrylic polymer (A) + hydroxyl groups in compound (C) having a steroid skeleton + hydroxyl groups in tackifier) |  |  |  |  | 0.5 | 0.5 | 0.6 | 0.7 | 0.5 | 0.5 | 0.4 | 0.7 | 0.7 |
| PP adhesive force (200 mm/min) | (N/25 mm) |  |  |  | 20 | 17 | 13 | 11 | 16 | 16 | 18 | 13 | 11 |
| Constant load peeling properties | 200 g | Peel length (mm) or fall time (seconds) |  |  | 1 mm | 3 mm | 10 mm | 28 mm | 8 mm | 9 mm | 60 mm | 40 mm | 78 mm |

|  |  |  | Hydroxyl group(s) | | | | | | | | | | |
|---|---|---|---|---|---|---|---|---|---|---|---|---|---|
|  | Name | Molecular weight | Type | Number of hydroxyl groups | Example 2-10 | Example 2-11 | Example 2-12 | Example 2-13 | Example 2-14 | Example 2-15 | Example 2-16 | Example 2-17 | Example 2-18 |
| Compound (C) having a steroid skeleton (parts) | Cholesterol | 386.7 | secondary | one | 5.0 | 5.0 | 5.0 | 5.0 | 5.0 | 5.0 | 5.0 | 10 | 10 |
|  | Dehydroepiandrosterone | 288.4 | secondary | one |  |  |  |  |  |  |  |  |  |
|  | Desoxycorticosterone | 330.5 | primary | one |  |  |  |  |  |  |  |  |  |
|  | Cholesterol acetate | 428.7 | none | none |  |  |  |  |  |  |  |  |  |
|  | Bolandiol | 276.4 | secondary | two |  |  |  |  |  |  |  |  |  |
|  | Solanine | 868.1 | primary, secondary | six |  |  |  |  |  |  |  |  |  |
| Acrylic polymer (A) (parts) | Synthesis Example 1 |  |  |  |  |  |  |  | 100 | 100 |  |  |  |
|  | Synthesis Example 2 |  |  |  |  |  |  |  |  |  | 100 |  |  |
|  | Synthesis Example 3 |  |  |  | 100 | 100 | 100 |  |  |  |  | 100 | 100 |
|  | Synthesis Example 4 |  |  |  |  |  |  | 100 |  |  |  |  |  |
| Polyfunctional isocyanate compound (B) (parts) | TDI-TMP |  |  |  | 6.6 | 11.0 | 13.2 | 10.3 |  | 10.3 | 8.8 | 12.6 | 12.6 |
|  | XDI-TMP |  |  |  |  |  |  |  | 11.6 |  |  |  |  |
| Silane coupling agent (E) (parts) | KBM-403 |  |  |  |  |  |  |  |  |  |  | 3 |  |
|  | KBM-9659 |  |  |  |  |  |  |  |  |  |  |  | 3 |
| Tackifier (parts) | KE-359 |  |  |  | 10 | 10 | 10 | 10 | 10 | 10 | 10 | 10 | 10 |
|  | D-125 |  |  |  | 15 | 15 | 15 | 15 | 15 | 15 | 15 | 15 | 15 |
| Isocyanate groups in polyfunctional isocyanate compound (B)/(hydroxyl groups in acrylic polymer (A) + hydroxyl groups in compound (C) having a steroid skeleton + hydroxyl groups in tackifier) |  |  |  |  | 0.9 | 1.5 | 1.8 | 1.2 | 1.2 | 1.4 | 1.2 | 1.2 | 1.2 |
| Isocyanate groups in polyfunctional isocyanate compound (B)/(hydroxyl groups and/or carboxyl groups in acrylic polymer (A) + hydroxyl groups in compound (C) having a steroid skeleton + hydroxyl groups in tackifier) |  |  |  |  | 0.4 | 0.6 | 0.8 | 1.2 | 1.2 | 1.2 | 0.5 | 0.6 | 0.6 |
| PP adhesive force (200 mm/min) | (N/25 mm) |  |  |  | 20 | 17 | 15 | 20 | 16 | 21 | 20 | 18 | 16 |
| Constant load peeling properties | 200 g | Peel length (mm) or fall time (seconds) |  |  | 7 mm | 10 mm | 20 mm | 35 mm | 45 mm | 75 mm | 30 mm | 20 mm | 15 mm |

TABLE 4

<<Embodiment 2 (adhesive for automobile)>>

| | Name | Molecular weight | Hydroxyl group(s) Type | Number of hydroxyl groups | Comparative Example 2-1 | Comparative Example 2-2 | Comparative Example 2-3 | Comparative Example 2-4 | Comparative Example 2-5 | Comparative Example 2-6 |
|---|---|---|---|---|---|---|---|---|---|---|
| Compound (C) having a steroid skeleton (parts) | Cholesterol | 386.7 | secondary | one | | | | 22 | | 22 |
| | Dehydroepiandrosterone | 288.4 | secondary | one | | | | | | |
| | Desoxycorticosterone | 330.5 | primary | one | | | | | | |
| | Cholesterol acetate | 428.7 | none | none | | | | | | |
| | Bolandiol | 276.4 | secondary | two | | | | | | |
| | Solanine | 868.1 | primary, secondary | six | | | | | | |
| Acrylic polymer (A) (parts) | | | Synthesis Example 1 | | | | | | | |
| | | | Synthesis Example 2 | | | | | | | |
| | | | Synthesis Example 3 | | 100 | 100 | 100 | 100 | | |
| | | | Synthesis Example 4 | | | | | | 100 | 100 |
| Polyfunctional isocyanate compound (B) (parts) | | | TDI-TMP | | 2.6 | 5.1 | 16.2 | 21.6 | 2.6 | 21.6 |
| | | | XDI-TMP | | | | | | | |
| Tackifier (parts) | | | KE-359 | | 10 | 10 | 10 | 10 | 10 | 10 |
| | | | D-125 | | 15 | 15 | 15 | 15 | 15 | 15 |
| Isocyanate groups in polyfunctional isocyanate compound (B)/(hydroxyl groups in acrylic polymer (A) + hydroxyl groups in compound (C) having a steroid skeleton + hydroxyl groups in tackifier) | | | | | 0.6 | 1.2 | 0.9 | 1.2 | 0.7 | 1.2 |
| Isocyanate groups in polyfunctional isocyanate compound (B)/(hydroxyl groups and/or carboxyl groups in acrylic polymer (A) + hydroxyl groups in compound (C) having a steroid skeleton + hydroxyl groups in tackifier) | | | | | 0.2 | 0.4 | 0.6 | 0.8 | 0.2 | 0.8 |
| PP adhesive force (200 mm/min) | | | (N/25 mm) | | 22 | 16 | 7 | 4 | 20 | 4 |
| Constant load peeling properties | 200 g | | Peel length (mm) or fall time (seconds) | | Fell after 80,000 seconds | Fell after 50,000 seconds | Fell after 65,000 seconds | Fell after 58,000 seconds | Fell after 30,000 seconds | Fell after 20,000 seconds |

Example 101

<Production of Adhesive Composition>

One hundred parts of the acrylic polymer (A) obtained in Synthesis Example 3 was blended uniformly with 11.0 parts of TDI-TMP as the polyfunctional isocyanate compound (B), 3.0 parts of cholesterol as the compound (C) having a steroid skeleton, and 10 parts of KE-359 and 15 parts of D-125 as tackifiers to form an adhesive composition, with each of the above amounts representing a non-volatile fraction equivalent amount.

<Production of Adhesive Sheet>

The obtained adhesive composition was applied to the release-treated surface of a polyethylene terephthalate releasable film substrate having a thickness of 38 μm (product name: SP-PET382050, manufactured by Lintec Corporation) using a doctor blade so as to achieve a coating with a thickness following drying of 65 μm, and the applied coating was then dried at 100° C. for two minutes to form an adhesive layer. The surface of this adhesive layer and the rear surface of a three-layer leather used as a surface skin material (D) were then stuck together using a hand roller under conditions including a roller temperature of 25° C. and a crimping strength of less than 10 N/cm, thus forming an adhesive sheet. This adhesive sheet was aged for one week in an environment having a temperature of 23° C. and a relative humidity of 50% to obtain an adhesive sheet.

Examples 102 to 124

With the exception of altering the acrylic polymer (A), the polyfunctional isocyanate compound (B), the compound (C) having a steroid skeleton, the surface skin material (D) and the silane coupling agent (E) as shown in Table 5 and Table 6, adhesive compositions and adhesive sheets were obtained using the same methods as those described for Example 101.

Comparative Examples 101 to 113

With the exception of altering the acrylic polymer (A), the polyfunctional isocyanate compound (B), the compound (C) having a steroid skeleton, the surface skin material (D) and the silane coupling agent (E) as shown in Table 8, adhesive compositions and adhesive sheets were obtained using the same methods as those described for Example 101.

<Evaluations>

The adhesive compositions and adhesive sheets obtained in Examples 101 to 124 and Comparative Examples 101 to 113 were each evaluated using the methods described below. The results are shown in Table 5, Table 6 and Table 8.

(PP Adhesive Force)

The adhesive force was measured in accordance with JIS Z 0237. The obtained adhesive sheet was cut to a width of 25 mm, the releasable film substrate was removed, the exposed adhesive layer was stuck to a polypropylene sheet (product name: Kobe Polysheet PP, manufactured by Yamaso Co., Ltd.) in an atmosphere having a temperature of 23° C. and a relative humidity of 50%, and after crimping by rolling a 2 kg roller once back and forth across the sheet, the sheet was left to stand in the same environment for 24 hours, and a tensile tester (product name: Tensilon, manufactured by Orientec Co., Ltd.) was then used to measure the peel strength when the adhesive sheet was peeled at a pull speed of 200 mm/minute in a direction at an angle of 180° C. in the same environment. In those cases where the surface skin material ruptured during the adhesive force measurement, the symbol ">" was recorded in the table, with the numerical value following the ">" indicating the peel strength when the surface skin material ruptured.

(Constant Load Peeling Properties)

The configuration used for testing the constant load peeling properties is described with reference to FIG. 1.

In an atmosphere at 23° C. (and a relative humidity of 50%), the releasable film substrate was peeled from an 80 mm-long portion of an adhesive sheet (2) that had been cut to a length of 100 mm and a width of 25 mm, the exposed adhesive layer was stuck to a propylene sheet (product name: Kobe Polysheet PP, manufactured by Yamaso Co., Ltd.) that functioned as an adherend (1), crimping was performed by rolling a 2 kg roller twice back and forth over the bonded portion, and the resulting structure was left to stand for 24 hours in an atmosphere at 23° C. (and a relative humidity of 50%). Subsequently, in an atmosphere at 80° C., a 100 g or 200 g weight (3) was attached to the non-bonded portion of the adhesive sheet (2), thereby applying a load in a direction perpendicular to the surface of the adherend (1), and the peeled length of the adhesive sheet after 24 hours had elapsed was measured in the same manner as described for Example 2-1.

Example 125

<Production of Adhesive Composition>

One hundred parts of the acrylic polymer (A) obtained in Synthesis Example 3 was blended uniformly with 13.2 parts of TDI-TMP as the polyfunctional isocyanate compound (B), 5.0 parts of cholesterol as the compound (C) having a steroid skeleton, and 10 parts of KE-359 and 15 parts of D-125 as tackifiers to form an adhesive composition, with each of the above amounts representing a non-volatile fraction equivalent amount.

<Production of Adhesive Sheet>

The obtained adhesive composition was applied to the release-treated surface of a polyethylene terephthalate releasable film substrate having a thickness of 38 μm (product name: SP-PET382050, manufactured by Lintec Corporation) using a doctor blade so as to achieve a coating with a thickness following drying of 65 μm, and the applied coating was then dried at 100° C. for two minutes to form an adhesive layer. The surface of this adhesive layer and the rear surface of a three-layer leather used as the surface skin material (D) were then stuck together using a hand roller under conditions including a roller temperature of 25° C. and a crimping strength of less than 10 N/cm, thus forming an adhesive sheet, and the sheet was then further crimped using the method of a crimping step (1) described below.

The obtained adhesive sheet was then aged for one week in an environment having a temperature of 23° C. and a relative humidity, and then crimped using the method of a crimping step (2) described below.

Subsequently, the adhesive sheet was cut to a length of 100 mm and a width of 25 mm, the releasable film substrate was peeled from an 80 mm-long portion, the exposed adhesive layer was stuck to a propylene sheet (product name: Kobe Polysheet PP, manufactured by Yamaso Co., Ltd.) that functioned as an adherend in an environment having a temperature of 23° C. and a relative humidity of 50%, crimping was performed by rolling a 2 kg roller twice back and forth over the bonded portion, and further crimping was performed using the method of a crimping step (3) described below.

<Crimping Step (1)>

Using a small table-top test laminator (product name: SA-1010, manufactured by Tester Sangyo Co., Ltd.), the adhesive sheet was crimped under conditions including a roller temperature of 25° C., a linear pressure of 150 N/cm and a crimping speed of 2.0 m/min.

<Crimping Step (2)>

Using a small table-top test laminator, the adhesive sheet was crimped under conditions including a roller temperature of 25° C., a linear pressure of 150 N/cm and a crimping speed of 2.0 m/min.

<Crimping Step (3)>

Using a small table-top test laminator, the adhesive sheet was crimped under conditions including a roller temperature of 25° C., a linear pressure of 150 N/cm and a crimping speed of 2.0 m/min.

Examples 126 to 143

With the exception of altering the acrylic polymer (A), the polyfunctional isocyanate compound (B), the compound (C) having a steroid skeleton, the surface skin material (D), the silane coupling agent (E), and the crimping conditions used in the crimping steps (1) to (3) as shown in Table 7, adhesive compositions and adhesive sheets were obtained using the same methods as those described for Example 125. In Table 7, in those cases where no numerical values are recorded in relation to the crimping conditions, a crimping operation was not performed.

Comparative Examples 114 to 124

With the exception of altering the acrylic polymer (A), the polyfunctional isocyanate compound (B), the compound (C) having a steroid skeleton, the surface skin material (D), the silane coupling agent (E), and the crimping conditions used in the crimping steps (1) to (3) as shown in Table 9, adhesive compositions and adhesive sheets were obtained using the same methods as those described for Example 125. In Table 9, in those cases where no numerical values are recorded in relation to the crimping conditions, a crimping operation was not performed.

<Evaluations>

The adhesive sheets obtained in Examples 125 to 143 and Comparative Examples 114 to 124 were each evaluated using the methods described below. The results are shown in Table 7 and Table 9.

(PP Adhesive Force)

The obtained adhesive sheet was left to stand for 24 hours in an atmosphere having a temperature of 23° C. and a relative humidity of 50%, and under the same environment, a tensile tester (product name: Tensilon, manufactured by Orientec Co., Ltd.) was then used to measure the peel strength when the adhesive sheet was peeled at a pull speed of 200 mm/minute in a direction at an angle of 180° C. In those cases where the surface skin material ruptured during the adhesive force measurement, the symbol ">" was recorded in the table, with the numerical value following the ">" indicating the peel strength when the surface skin material ruptured.

(Constant Load Peeling Properties)

The configuration used for testing the constant load peeling properties is described with reference to FIG. 1.

The obtained adhesive sheet was left to stand for 24 hours in an atmosphere at 23° C. (and a relative humidity of 50%), a 100 g or 200 g weight (3) was then attached to the non-bonded portion of the adhesive sheet (2) in an atmosphere at 80° C., thereby applying a load in a direction perpendicular to the surface of the adherend (1), and the peeled length of the adhesive sheet after 24 hours had elapsed was measured in the same manner as described for Example 2-1.

TABLE 5

<<Embodiment 2 (adhesive for automobile)>>

| | Name | Molecular weight | Hydroxyl group(s) Type | Number of hydroxyl groups | Example 101 | Example 102 | Example 103 | Example 104 | Example 105 | Example 106 | Example 107 | Example 108 | Example 109 | Example 110 |
|---|---|---|---|---|---|---|---|---|---|---|---|---|---|---|
| Compound (C) having a steroid skeleton (parts) | Cholesterol | 386.7 | secondary | one | 3.0 | 5.0 | 10 | 15 | | | | | | |
| | Phytosterol | — | secondary | one | | | | | 5.0 | | | | | |
| | Dehydroepiandrosterone | 288.4 | secondary | one | | | | | | 5.0 | | | | |
| | Desoxycorticosterone | 330.5 | primary | one | | | | | | | 5.0 | | | |
| | Cholesterol acetate | 428.7 | none | none | | | | | | | | 5.0 | | |
| | Bolandiol | 276.4 | secondary | two | | | | | | | | | 5.0 | |
| | Solanine | 868.1 | primary, secondary | six | | | | | | | | | | 5.0 |
| Acrylic polymer (A) (parts) | | | Synthesis Example 1 | | | | | | | | | | | |
| | | | Synthesis Example 2 | | | | | | | | | | | |
| | | | Synthesis Example 3 | | 100 | 100 | 100 | 100 | 100 | 100 | 100 | 100 | 100 | 100 |
| | | | Synthesis Example 4 | | | | | | | | | | | |
| Polyfunctional isocyanate compound (B) (parts) | | | TDI-TMP | | 11.0 | 13.2 | 18.9 | 24.5 | 12.9 | 15.1 | 14.2 | 7.6 | 23.4 | 30.2 |
| | | | XDI-TMP | | | | | | | | | | | |
| Silane coupling agent (E) (parts) | | | KBM-403 | | | | | | | | | | | |
| | | | KBM-9659 | | | | | | | | | | | |
| Tackifier (parts) | | | KE-359 | | 10 | 10 | 10 | 10 | 10 | 10 | 10 | 10 | 10 | 10 |
| | | | D-125 | | 15 | 15 | 15 | 15 | 15 | 15 | 15 | 15 | 15 | 15 |
| Isocyanate groups in polyfunctional isocyanate compound (B)/(hydroxyl groups in acrylic polymer (A) + hydroxyl groups in compound (C) having a steroid skeleton + hydroxyl groups in tackifier) | | | | | 1.8 | 1.8 | 1.8 | 1.8 | 1.8 | 1.8 | 1.8 | 1.8 | 1.8 | 1.8 |
| Isocyanate groups in polyfunctional isocyanate compound (B)/(hydroxyl groups and/or carboxyl groups in acrylic polymer (A) + hydroxyl groups in compound (C) having a steroid skeleton + hydroxyl groups in tackifier) | | | | | 0.7 | 0.8 | 0.9 | 1.0 | 0.8 | 0.8 | 0.8 | 0.5 | 1.0 | 1.1 |
| Surface skin material (D) | | | Three-layer leather | | ○ | ○ | ○ | ○ | ○ | ○ | ○ | ○ | ○ | ○ |
| | | | Single-layer fabric A | | | | | | | | | | | |
| | | | Single-layer fabric B | | | | | | | | | | | |
| | | | Urethane foam | | | | | | | | | | | |
| | | | EPDM foam | | | | | | | | | | | |
| PP adhesive force (200 mm/min) | | | (N/25 mm) | | >12 | 7 | 5 | 3 | 7 | 5 | 5 | 7 | 4 | 3 |
| Constant load peeling properties | 100 g | | Peel length (mm) or fall time (seconds) | | 74 mm | 10 mm | 4 mm | 35 mm | 11 mm | 13 mm | 27 mm | 65 mm | 16 mm | 20 mm |
| | 200 g | | Peel length (mm) or fall time (seconds) | | Fell after 27,000 seconds | 57 mm | 23 mm | 77 mm | 60 mm | 63 mm | 75 mm | Fell after 55,000 seconds | 66 mm | 78 mm |

TABLE 6

<<Embodiment 2 (adhesive for automobile)>>

| | Name | Molecular weight | Hydroxyl group(s) Type | Number of hydroxyl groups | Example 111 | Example 112 | Example 113 | Example 114 | Example 115 | Example 116 | Example 117 |
|---|---|---|---|---|---|---|---|---|---|---|---|
| Compound (C) having a steroid skeleton (parts) | Cholesterol | 386.7 | secondary | one | 5.0 | 5.0 | 5.0 | 5.0 | 5.0 | 5.0 | 5.0 |
| | Phytosterol | — | secondary | one | | | | | | | |
| | Dehydroepiandrosterone | 288.4 | secondary | one | | | | | | | |
| | Desoxycorticosterone | 330.5 | primary | one | | | | | | | |
| | Cholesterol acetate | 428.7 | none | none | | | | | | | |
| | Bolandiol | 276.4 | secondary | two | | | | | | | |
| | Solanine | 868.1 | primary, secondary | six | | | | | | | |
| Acrylic polymer (A) (parts) | | | Synthesis Example 1 | | | | 100 | 100 | | | |
| | | | Synthesis Example 2 | | | | | | 100 | | |
| | | | Synthesis Example 3 | | 100 | 100 | | | | 100 | |
| | | | Synthesis Example 4 | | | | | | | | 100 |

TABLE 6-continued

| <<Embodiment 2 (adhesive for automobile)>> | | | | | | | | |
|---|---|---|---|---|---|---|---|---|
| Polyfunctional isocyanate compound (B) (parts) | TDI-TMP | 11.0 | 15.4 | 13.2 | | | | 13.2 |
| | XDI-TMP | | | | 13.2 | | | |
| Silane coupling agent (E) (parts) | KBM-403 | | | | | | | 1.0 |
| | KBM-9659 | | | | | | | |
| Tackifier (parts) | KE-359 | 10 | 10 | 10 | 10 | 10 | 10 | 10 |
| | D-125 | 15 | 15 | 15 | 15 | 15 | 15 | 15 |
| Isocyanate groups in polyfunctional isocyanate compound (B)/ (hydroxyl groups in acrylic polymer (A) + hydroxyl groups in compound (C) having a steroid skeleton + hydroxyl groups in tackifier) | | 1.5 | 2.1 | 1.5 | 1.4 | 1.9 | 1.9 | 1.8 |
| Isocyanate groups in polyfunctional isocyanate compound (B)/ (hydroxyl groups and/or carboxyl groups in acrylic polymer (A) + hydroxyl groups in compound (C) having a steroid skeleton + hydroxyl groups in tackifier) | | 0.6 | 0.9 | 1.5 | 1.4 | 1.5 | 0.8 | 0.8 |
| Surface skin material (D) | Three-layer leather | ○ | ○ | ○ | ○ | ○ | ○ | ○ |
| | Single-layer fabric A | | | | | | | |
| | Single-layer fabric B | | | | | | | |
| | Urethane foam | | | | | | | |
| | EPDM foam | | | | | | | |
| PP adhesive force (200 mm/min) | (N/25 mm) | >12 | 5 | 10 | 8 | 6 | 4 | 8 |
| Constant load peeling properties | 100 g | Peel length (mm) or fall time (seconds) | 78 mm | 8 mm | 15 mm | 18 mm | 60 mm | 45 mm | 11 mm |
| | 200 g | Peel length (mm) or fall time (seconds) | Fell after 13,000 seconds | 33 mm | 63 mm | 67 mm | Fell after 40,000 seconds | Fell after 60,000 seconds | 60 mm |

| | | | Hydroxyl group(s) | | | | | | | | |
|---|---|---|---|---|---|---|---|---|---|---|---|
| | Name | Molecular weight | Type | Number of hydroxyl groups | Example 118 | Example 119 | Example 120 | Example 121 | Example 122 | Example 123 | Example 124 |
| Compound (C) having a steroid skeleton (parts) | Cholesterol | 386.7 | secondary | one | 5.0 | 5.0 | 5.0 | 5.0 | 5.0 | 5.0 | 5.0 |
| | Phytosterol | — | secondary | one | | | | | | | |
| | Dehydroepiandrosterone | 288.4 | secondary | one | | | | | | | |
| | Desoxycorticosterone | 330.5 | primary | one | | | | | | | |
| | Cholesterol acetate | 428.7 | none | none | | | | | | | |
| | Bolandiol | 276.4 | secondary | two | | | | | | | |
| | Solanine | 868.1 | primary, secondary | six | | | | | | | |
| Acrylic polymer (A) (parts) | | Synthesis Example 1 | | | | | | | | | |
| | | Synthesis Example 2 | | | | | | | | | |
| | | Synthesis Example 3 | | | 100 | 100 | 100 | 100 | 100 | 100 | 100 |
| | | Synthesis Example 4 | | | | | | | | | |
| Polyfunctional isocyanate compound (B) (parts) | TDI-TMP | | | | 13.2 | 13.2 | 13.2 | 13.2 | 13.2 | 13.2 | 13.2 |
| | XDI-TMP | | | | | | | | | | |
| Silane coupling agent (E) (parts) | KBM-403 | | | | 3.0 | 7.0 | | | | | |
| | KBM-9659 | | | | | | 3.0 | | | | |
| Tackifier (parts) | KE-359 | | | | 10 | 10 | 10 | 10 | 10 | 10 | 10 |
| | D-125 | | | | 15 | 15 | 15 | 15 | 15 | 15 | 15 |
| Isocyanate groups in polyfunctional isocyanate compound (B)/ (hydroxyl groups in acrylic polymer (A) + hydroxyl groups in compound (C) having a steroid skeleton + hydroxyl groups in tackifier) | | | | | 1.8 | 1.8 | 1.8 | 1.8 | 1.8 | 1.8 | 1.8 |
| Isocyanate groups in polyfunctional isocyanate compound (B)/ (hydroxyl groups and/or carboxyl groups in acrylic polymer (A) + hydroxyl groups in compound (C) having a steroid skeleton + hydroxyl groups in tackifier) | | | | | 0.8 | 0.8 | 0.8 | 0.8 | 0.8 | 0.8 | 0.8 |
| Surface skin material (D) | Three-layer leather | | | | ○ | ○ | ○ | | | | |
| | Single-layer fabric A | | | | | | | ○ | | | |
| | Single-layer fabric B | | | | | | | | ○ | | |
| | Urethane foam | | | | | | | | | ○ | |
| | EPDM foam | | | | | | | | | | ○ |
| PP adhesive force (200 mm/min) | (N/25 mm) | | | | 11 | >12 | 9 | 7 | 7 | 9 | 6 |
| Constant load peeling properties | 100 g | Peel length (mm) or fall time (seconds) | | | 13 mm | 35 mm | 10 mm | 7 mm | 4 mm | 26 mm | 28 mm |
| | 200 g | Peel length (mm) or fall time (seconds) | | | 64 mm | Fell after 70,000 seconds | 59 mm | 42 mm | 25 mm | 62 mm | 70 mm |

TABLE 7

<<Embodiment 2 (adhesive for automobile)>>

| | Name | Molecular weight | Hydroxyl group(s) Type | Number of hydroxyl groups | Example 125 | Example 126 | Example 127 | Example 128 | Example 129 | Example 130 | Example 131 | Example 132 | Example 133 | Example 134 |
|---|---|---|---|---|---|---|---|---|---|---|---|---|---|---|
| Compound (C) having a steroid skeleton (parts) | Cholesterol | 386.7 | secondary | one | 5.0 | 5.0 | 5.0 | 5.0 | 5.0 | 5.0 | 5.0 | 5.0 | 5.0 | 5.0 |
| | Phytosterol | — | secondary | one | | | | | | | | | | |
| | Dehydroepiandrosterone | 288.4 | secondary | one | | | | | | | | | | |
| | Desoxycorticosterone | 330.5 | primary | one | | | | | | | | | | |
| | Cholesterol acetate | 428.7 | none | none | | | | | | | | | | |
| | Bolandiol | 276.4 | secondary | two | | | | | | | | | | |
| | Solanine | 868.1 | primary, secondary | six | | | | | | | | | | |
| Acrylic polymer (A) (parts) | | Synthesis Example 1 | | | | | | | | | | | | |
| | | Synthesis Example 2 | | | | | | | | | | | | |
| | | Synthesis Example 3 | | | 100 | 100 | 100 | 100 | 100 | 100 | 100 | 100 | 100 | 100 |
| | | Synthesis Example 4 | | | | | | | | | | | | |
| Polyfunctional isocyanate compound (B) (parts) | | TDI-TMP | | | 13.2 | 13.2 | 13.2 | 13.2 | 13.2 | 13.2 | 13.2 | 13.2 | 13.2 | 13.2 |
| | | XDI-TMP | | | | | | | | | | | | |
| Silane coupling agent (E) (parts) | | KBM-403 | | | | | | | | | | | | |
| | | KBM-9659 | | | | | | | | | | | | |
| Tackifier (parts) | | KE-359 | | | 10 | 10 | 10 | 10 | 10 | 10 | 10 | 10 | 10 | 10 |
| | | D-125 | | | 15 | 15 | 15 | 15 | 15 | 15 | 15 | 15 | 15 | 15 |
| Isocyanate groups in polyfunctional isocyanate compound (B)/ (hydroxyl groups in acrylic polymer (A) + hydroxyl groups in compound (C) having a steroid skeleton + hydroxyl groups in tackifier) | | | | | 1.8 | 1.8 | 1.8 | 1.8 | 1.8 | 1.8 | 1.8 | 1.8 | 1.8 | 1.8 |
| Isocyanate groups in polyfunctional isocyanate compound (B)/ (hydroxyl groups and/or carboxyl groups in acrylic polymer (A) + hydroxyl groups in compound (C) having a steroid skeleton + hydroxyl groups in tackifier) | | | | | 0.8 | 0.8 | 0.8 | 0.8 | 0.8 | 0.8 | 0.8 | 0.8 | 0.8 | 0.8 |
| Surface skin material (D) | | Three-layer leather | | | ○ | ○ | ○ | ○ | ○ | ○ | ○ | ○ | ○ | ○ |
| | | Single-layer fabric A | | | | | | | | | | | | |
| | | Single-layer fabric B | | | | | | | | | | | | |
| | | Urethane foam | | | | | | | | | | | | |
| | | EPDM foam | | | | | | | | | | | | |
| Crimping conditions | Crimping step (1) | Temperature (° C.) | | | 25 | 25 | 25 | 25 | 25 | 50 | 80 | 50 | 80 | |
| | | Crimping strength (N/cm) | | | 150 | 50 | 150 | 500 | 800 | 50 | 50 | 150 | 150 | |
| | Crimping step (2) | Temperature (° C.) | | | 25 | | | | | | | | | 25 |
| | | Crimping strength (N/cm) | | | 150 | | | | | | | | | 150 |
| | Crimping step (3) | Temperature (° C.) | | | 25 | | | | | | | | | |
| | | Crimping strength (N/cm) | | | 150 | | | | | | | | | |
| PP adhesive force (200 mm/min) | | (N/25 mm) | | | 10 | 7 | 5 | 4 | 4 | 6 | 5 | 5 | 4 | 7 |
| Constant load peeling properties | 100 g | Peel length (mm) or fall time (seconds) | | | 1 mm | 6 mm | 1 mm | 2 mm | 5 mm | 4 mm | 2 mm | 2 mm | 6 mm | 7 mm |
| | 200 g | Peel length (mm) or fall time (seconds) | | | 3 mm | 20 mm | 4 mm | 7 mm | 15 mm | 13 mm | 6 mm | 8 mm | 15 mm | 35 mm |

| | Name | Molecular weight | Hydroxyl group(s) Type | Number of hydroxyl groups | Example 135 | Example 136 | Example 137 | Example 138 | Example 139 | Example 140 | Example 141 | Example 142 | Example 143 |
|---|---|---|---|---|---|---|---|---|---|---|---|---|---|
| Compound (C) having a steroid skeleton (parts) | Cholesterol | 386.7 | secondary | one | 5.0 | 5.0 | 5.0 | | 5.0 | 5.0 | 5.0 | 5.0 | 5.0 |
| | Phytosterol | — | secondary | one | | | | | | | | | |
| | Dehydroepiandrosterone | 288.4 | secondary | one | | | | | | | | | |
| | Desoxycorticosterone | 330.5 | primary | one | | | | | | | | | |
| | Cholesterol acetate | 428.7 | none | none | | | | | | | | | |
| | Bolandiol | 276.4 | secondary | two | | | | | | | | | |
| | Solanine | 868.1 | primary, secondary | six | | | | | | | | | |
| Acrylic polymer (A) (parts) | | Synthesis Example 1 | | | | | | | | | | | |
| | | Synthesis Example 2 | | | | | | | | | | | |
| | | Synthesis Example 3 | | | 100 | 100 | 100 | | 100 | 100 | 100 | 100 | 100 |
| | | Synthesis Example 4 | | | | | | 100 | | | | | |
| Polyfunctional isocyanate compound (B) (parts) | | TDI-TMP | | | 13.2 | 13.2 | 13.2 | 13.2 | | 13.2 | 13.2 | 13.2 | 13.2 |
| | | XDI-TMP | | | | | | | | | | | |
| Silane coupling agent (E) (parts) | | KBM-403 | | | | | | | 5.0 | | | | |
| | | KBM-9659 | | | | | | | | | | | |
| Tackifier (parts) | | KE-359 | | | 10 | 10 | 10 | 10 | 10 | 10 | 10 | 10 | 10 |
| | | D-125 | | | 15 | 15 | 15 | 15 | 15 | 15 | 15 | 15 | 15 |

TABLE 7-continued

<<Embodiment 2 (adhesive for automobile)>>

| | | | | | | | | | | | |
|---|---|---|---|---|---|---|---|---|---|---|---|
| Isocyanate groups in polyfunctional isocyanate compound (B)/ (hydroxyl groups in acrylic polymer (A) + hydroxyl groups in compound (C) having a steroid skeleton + hydroxyl groups in tackifier) | | | 1.8 | 1.8 | 1.8 | 1.9 | 1.8 | 1.8 | 1.8 | 1.8 | 1.8 |
| Isocyanate groups in polyfunctional isocyanate compound (B)/ (hydroxyl groups and/or carboxyl groups in acrylic polymer (A) + hydroxyl groups in compound (C) having a steroid skeleton + hydroxyl groups in tackifier) | | | 0.8 | 0.8 | 0.8 | 0.8 | 0.8 | 0.8 | 0.8 | 0.8 | 0.8 |
| Surface skin material (D) | | Three-layer leather | ○ | ○ | ○ | ○ | ○ | | | | |
| | | Single-layer fabric A | | | | | | ○ | | | |
| | | Single-layer fabric B | | | | | | | ○ | | |
| | | Urethane foam | | | | | | | | ○ | |
| | | EPDM foam | | | | | | | | | ○ |
| Crimping conditions | Crimping step (1) | Temperature (° C.) | | 25 | 25 | 25 | 25 | 25 | 25 | 25 | 25 |
| | | Crimping strength (N/cm) | | 150 | 150 | 150 | 150 | 150 | 150 | 150 | 150 |
| | Crimping step (2) | Temperature (° C.) | | | | | | | | | |
| | | Crimping strength (N/cm) | | | | | | | | | |
| | Crimping step (3) | Temperature (° C.) | 25 | 25 | 25 | | | 25 | 25 | 25 | 25 |
| | | Crimping strength (N/cm) | 150 | 150 | 150 | | | 150 | 150 | 150 | 150 |
| PP adhesive force (200 mm/min) | | (N/25 mm) | >12 | 10 | 12 | 4 | 8 | 12 | 11 | 13 | 12 |
| Constant load peeling properties | 100 g | Peel length (mm) or fall time (seconds) | 8 mm | 1 mm | 1 mm | 28 mm | 2 mm | 1 mm | 1 mm | 3 mm | 6 mm |
| | 200 g | Peel length (mm) or fall time (seconds) | 50 mm | 3 mm | 4 mm | Fell after 70,000 seconds | 7 mm | 3 mm | 8 mm | 11 mm | 13 mm |

TABLE 8

<<Embodiment 2 (adhesive for automobile)>>

| | | | Hydroxyl group(s) | | Comparative Example 101 | Comparative Example 102 | Comparative Example 103 | Comparative Example 104 | Comparative Example 105 | Comparative Example 106 | Comparative Example 107 | Comparative Example 108 | Comparative Example 109 | Comparative Example 110 | Comparative Example 111 | Comparative Example 112 | Comparative Example 113 |
|---|---|---|---|---|---|---|---|---|---|---|---|---|---|---|---|---|---|
| | Name | Molecular weight | Type | Number of hydroxyl groups | | | | | | | | | | | | | |
| Compound (C) having a steroid skeleton (parts) | Cholesterol | 386.7 | secondary | one | | | | | | | 22 | 22 | 22 | 22 | 22 | 22 | 22 |
| | Phytosterol | — | secondary | one | | | | | | | | | | | | | |
| | Dehydroepiandrosterone | 288.4 | secondary | one | | | | | | | | | | | | | |
| | Desoxycorticosterone | 330.5 | primary | one | | | | | | | | | | | | | |
| | Cholesterol acetate | 428.7 | none | none | | | | | | | | | | | | | |
| | Bolandiol | 276.4 | secondary | two | | | | | | | | | | | | | |
| | Solanine | 868.1 | primary, secondary | six | | | | | | | | | | | | | |
| Acrylic polymer (A) (parts) | Synthesis Example 1 | | | | 100 | 100 | 100 | 100 | 100 | 100 | 100 | 100 | 100 | 100 | 100 | | |
| | Synthesis Example 2 | | | | | | | | | | | | | | | 100 | |
| | Synthesis Example 3 | | | | | | | | | | | | | | | | 100 |
| | Synthesis Example 4 | | | | | | | | | | | | | | | | |
| Polyfunctional isocyanate compound (B) (parts) | TDI-TMP | | | | 2.6 | 7.6 | 2.6 | 2.6 | 2.6 | 2.6 | 32.4 | 32.4 | 32.4 | 32.4 | 32.4 | 2.62 | 32.4 |
| | XDI-TMP | | | | | | | | | | | | | | | | |
| Silane coupling agent (E) (parts) | KBM-403 | | | | 10 | 10 | 10 | 10 | 10 | 10 | 10 | 10 | 10 | 10 | 10 | 10 | 10 |
| | KBM-9659 | | | | 15 | 15 | 15 | 15 | 15 | 15 | 15 | 15 | 15 | 15 | 15 | 15 | 15 |
| Tackifier (parts) | KE-359 | | | | 0.6 | 1.8 | 0.6 | 0.6 | 0.6 | 0.6 | 1.8 | 1.8 | 1.8 | 1.8 | 1.8 | 0.7 | 1.8 |
| | D-125 | | | | | | | | | | | | | | | | |
| Isocyanate groups in polyfunctional isocyanate compound (B)/(hydroxyl groups in acrylic polymer (A) + hydroxyl groups in compound (C) having a steroid skeleton + hydroxyl groups in tackifier) | | | | | 0.1 | 0.2 | 0.1 | 0.1 | 0.1 | 0.1 | 0.7 | 0.7 | 0.7 | 0.7 | 0.7 | 0.1 | 0.7 |
| Isocyanate groups in polyfunctional isocyanate compound (B)/(hydroxyl groups and/or carboxyl groups in acrylic polymer (A) + hydroxyl groups in compound (C) having a steroid skeleton + hydroxyl groups in tackifier) | | | | | | | | | | | | | | | | | |
| Surface skin material (D) | Three-layer leather | | | | ○ | ○ | | | | | | | | | | | |
| | Single-layer fabric A | | | | | | ○ | | | | | | | | | | |
| | Single-layer fabric B | | | | | | | ○ | | | | | | | | | |
| | Urethane foam | | | | | | | | ○ | | ○ | | | | | | |
| | EPDM foam | | | | | | | | | ○ | | ○ | ○ | ○ | ○ | ○ | ○ |
| PP adhesive force (200 mm/min) (N/25 mm) | | | | | >12 | >12 | 18 | 16 | >16 | >13 | 3 | 4 | 2 | 4 | 3 | 7 | 5 |
| Constant load peeling properties | 100 g | Peel length (mm) or fall time (seconds) | | | fell at 22,000 seconds | fell at 30,000 seconds | fell at 25,000 seconds | fell at 33,000 seconds | fell at 18,000 seconds | fell at 17,000 seconds | fell at 62,000 seconds | fell at 65,000 seconds | fell at 81,000 seconds | fell at 61,000 seconds | fell at 57,000 seconds | fell at 10,000 seconds | fell at 30,000 seconds |
| | 200 g | Peel length (mm) or fall time (seconds) | | | fell at 420 seconds | fell at 900 seconds | fell at 800 seconds | fell at 1,100 seconds | fell at 400 seconds | fell at 350 seconds | fell at 6,500 seconds | fell at 7,000 seconds | fell at 8,200 seconds | fell at 6,600 seconds | fell at 6,200 seconds | fell at 200 seconds | fell at 2,000 seconds |

TABLE 9

<<Embodiment 2 (adhesive for automobile)>>

| | | Hydroxyl group(s) | | | Comparative Example 114 | Comparative Example 115 | Comparative Example 116 | Comparative Example 117 | Comparative Example 118 | Comparative Example 119 | Comparative Example 120 | Comparative Example 121 | Comparative Example 122 | Comparative Example 123 | Comparative Example 124 |
|---|---|---|---|---|---|---|---|---|---|---|---|---|---|---|---|
| | Name | Molecular weight | Type | Number of hydroxyl groups | | | | | | | | | | | |
| Compound (C) having a steroid skeleton (parts) | Cholesterol | 386.7 | secondary | one | 100 | | | | | | | | | | |
| | Phytosterol | — | secondary | one | | 100 | | | | | | | | | |
| | Dehydroepiandrosterone | 288.4 | secondary | one | | | 100 | | | | | | | | |
| | Desoxycorticosterone | 330.5 | primary | one | | | | 100 | | | | | | | |
| | Cholesterol acetate | 428.7 | none | none | | | | | 100 | | | | | | |
| | Bolandiol | 276.4 | secondary | two | | | | | | 100 | | | | | |
| | Solanine | 868.1 | primary, secondary | six | | | | | | | 100 | | | | |
| Acrylic polymer (A) (parts) | Synthesis Example 1 | | | | | | | | | | | 100 | 100 | 100 | |
| | Synthesis Example 2 | | | | | | | | | | | | | | 100 |
| | Synthesis Example 3 | | | | | | | | | | | | | | |
| | Synthesis Example 4 | | | | | | | | | | | | | | |
| Polyfunctional isocyanate compound (B) (parts) | TDI-TMP | | | | 2.6 | 2.6 | 2.6 | 2.6 | 2.6 | 2.6 | 2.6 | 32.4 | 32.4 | 2.6 | 32.4 |
| | XDI-TMP | | | | | | | | | | | | | | |
| Silane coupling agent (E) | KBM-403 | | | | 10 | 10 | 10 | 10 | 10 | 10 | 10 | 10 | 10 | 10 | 10 |
| | KBM-9659 | | | | | | | | | | | | | | |
| Tackifier (parts) | KE-359 | | | | 15 | 15 | 15 | 15 | 15 | 15 | 15 | 15 | 15 | 15 | 15 |
| | D-125 | | | | 0.6 | 0.6 | 0.6 | 0.6 | 0.6 | 0.6 | 0.6 | 1.8 | 1.8 | 0.7 | 1.8 |
| Isocyanate groups in polyfunctional isocyanate compound (B)/(hydroxyl groups in acrylic polymer (A) + hydroxyl groups in compound (C) having a steroid skeleton + hydroxyl groups in tackifier) | | | | | 0.1 | 0.1 | 0.1 | 0.1 | 0.1 | 0.1 | 0.1 | 0.7 | 0.7 | 0.1 | 0.7 |
| Isocyanate groups in polyfunctional isocyanate compound (B)/(hydroxyl groups and/or carboxyl groups in acrylic polymer (A) + hydroxyl groups in compound (C) having a steroid skeleton + hydroxyl groups in tackifier) | | | | | | | | | | | | | | | |

TABLE 9-continued

<<Embodiment 2 (adhesive for automobile)>>

| | | | Comparative Example 114 | Comparative Example 115 | Comparative Example 116 | Comparative Example 117 | Comparative Example 118 | Comparative Example 119 | Comparative Example 120 | Comparative Example 121 | Comparative Example 122 | Comparative Example 123 | Comparative Example 124 |
|---|---|---|---|---|---|---|---|---|---|---|---|---|---|
| Surface skin material (D) | Name | Three-layer leather | ○ | ○ | ○ | ○ | ○ | ○ | ○ | ○ | ○ | ○ | ○ |
| | | Single-layer fabric A | | | | | | | | | | | |
| | | Single-layer fabric B | | | | | | | | | | | |
| | | Urethane foam | | | | | | | | | | | |
| | | EPDM foam | | | | | | | | | | | |
| | Hydroxyl group(s) | Molecular weight | | | | | | | | | | | |
| | | Type | | | | | | | | | | | |
| | | Number of hydroxyl groups | | | | | | | | | | | |
| Crimping conditions | Crimping step (1) | Temperature (° C.) | 25 | 25 | 25 | 80 | | | | 25 | 25 | 25 | 25 |
| | | Crimping strength (N/cm) | 150 | 500 | 150 | 150 | | | | 150 | 150 | 150 | 150 |
| | Crimping step (2) | Temperature (° C.) | | | | | 25 | | 25 | | | | |
| | | Crimping strength (N/cm) | | | | | 150 | | 150 | | | | |
| | Crimping step (3) | Temperature (° C.) | | | | | | 25 | 25 | | 25 | | |
| | | Crimping strength (N/cm) | | | | | | 150 | 150 | | 150 | | |
| PP adhesive force (200 mm/min) (N/25 mm) | | | >12 | 8 | 11 | 8 | >12 | >12 | >12 | 3 | 7 | 5 | 5 |
| Constant load peeling properties | 100 g | Peel length (mm) or fall time (seconds) | fell at 40,000 sec | fell at 31,000 sec | fell at 37,000 sec | fell at 34,000 sec | fell at 25,000 sec | fell at 30,000 sec | fell at 37,000 sec | fell at 80,000 sec | fell at 78,000 sec | fell at 20,000 sec | fell at 50,000 sec |
| | 200 g | Peel length (mm) or fall time (seconds) | fell at 2,700 sec | fell at 2,000 sec | fell at 2,500 sec | fell at 2,200 sec | fell at 1,000 sec | fell at 600 sec | fell at 2,600 sec | fell at 10,000 sec | fell at 9,000 sec | fell at 1,500 sec | fell at 7,000 sec |

The invention claimed is:

1. An adhesive composition comprising an acrylic polymer (A), a polyfunctional isocyanate compound (B) and a compound (C) having a steroid skeleton, wherein
the acrylic polymer (A) is an acrylic polymer having a carboxyl group,
an amount of the compound (C) having the steroid skeleton is from 0.1 to 20 parts by mass per 100 parts by mass of the acrylic polymer (A),
the compound (C) having the steroid skeleton is any one of β-sitosterol, campesterol, stigmasterol, brassicasterol, lanosterol, ergosterol, β-cholestanol, coprostanol, epicholestanol or 7-dehydrocholesterol,
a molar ratio between an isocyanate group in the polyfunctional isocyanate compound (B) and the combined total of a hydroxyl group and the carboxyl group in the acrylic polymer (A) and a hydroxyl group in the compound (C) having the steroid skeleton is from 0.05 to 1.5, and
a glass transition temperature of the acrylic polymer (A) is within a range from −60 to 0° C.

2. The adhesive composition according to claim 1, wherein the composition further comprises 0.1 to 10 parts by mass of a silane coupling agent (E) per 100 parts by mass of the acrylic polymer (A).

3. The adhesive composition according to claim 1, wherein a proportion of a monomer having a hydroxyl group and/or a carboxyl group and an ethylenic unsaturated bond is from 0.1 to 20 parts by mass per 100 parts by mass of all monomers that constitute the acrylic polymer (A).

4. The adhesive composition according to claim 1, wherein the acrylic polymer (A) has the hydroxyl group.

5. The adhesive composition according to claim 1, wherein a weight-average molecular weight of the acrylic polymer (A) is within a range from 300,000 to 1,500,000.

6. An adhesive sheet formed by laminating an adhesive layer comprising the adhesive composition according to claim 1 to at least one surface of a sheet-like substrate.

7. The adhesive sheet according to claim 6, wherein the sheet-like substrate is a surface skin material (D).

8. A method for producing an adhesive sheet by forming an adhesive layer by coating and/or bonding on one surface of a surface skin material (D), wherein
the adhesive layer comprises an adhesive composition comprising an acrylic polymer (A), a polyfunctional isocyanate compound (B) and a compound (C) having a steroid skeleton,
the acrylic polymer (A) is an acrylic polymer having a carboxyl group,
an amount of the compound (C) having the steroid skeleton is from 0.1 to 20 parts by mass per 100 parts by mass of the acrylic polymer (A),
the compound (C) having the steroid skeleton is any one of β-sitosterol, campesterol, stigmasterol, brassicasterol, lanosterol, ergosterol, β-cholestanol, coprostanol, epicholestanol or 7-dehydrocholesterol,
a molar ratio between an isocyanate group in the polyfunctional isocyanate compound (B) and the combined total of a hydroxyl group and the carboxyl group in the acrylic polymer (A) and a hydroxyl group in the compound (C) having the steroid skeleton is from 0.05 to 1.5, and
a glass transition temperature of the acrylic polymer (A) is within a range from −60 to 0° C.

9. The method for producing an adhesive sheet according to claim 8, wherein a proportion of a monomer having a hydroxyl group and/or a carboxyl group and an ethylenic unsaturated bond is from 0.1 to 20 parts by mass per 100 parts by mass of all monomers that constitute the acrylic polymer (A).

10. The method for producing an adhesive sheet according to claim 8, wherein the acrylic polymer (A) has the hydroxyl group.

11. The method for producing an adhesive sheet according to claim 8, wherein a weight-average molecular weight of the acrylic polymer (A) is within a range from 300,000 to 1,500,000.

* * * * *